United States Patent
Obana

(10) Patent No.: US 10,166,819 B2
(45) Date of Patent: Jan. 1, 2019

(54) PNEUMATIC TIRE

(71) Applicant: The Yokohama Rubber Co., LTD., Minato-ku, Tokyo (JP)

(72) Inventor: Kentaroh Obana, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 323 days.

(21) Appl. No.: 14/655,856

(22) PCT Filed: Dec. 28, 2012

(86) PCT No.: PCT/JP2012/084219
§ 371 (c)(1),
(2) Date: Jun. 26, 2015

(87) PCT Pub. No.: WO2014/103068
PCT Pub. Date: Jul. 3, 2014

(65) Prior Publication Data
US 2015/0321519 A1 Nov. 12, 2015

(51) Int. Cl.
*B60C 9/28* (2006.01)
*B60C 11/01* (2006.01)
(Continued)

(52) U.S. Cl.
CPC ............... *B60C 11/04* (2013.01); *B60C 3/04* (2013.01); *B60C 9/1835* (2013.01); *B60C 9/20* (2013.01);
(Continued)

(58) Field of Classification Search
CPC ........... B60C 9/28; B60C 9/22; B60C 9/0292; B60C 11/0083
See application file for complete search history.

(56) References Cited

U.S. PATENT DOCUMENTS 3,939,890 A * 2/1976 Abe .................. B60C 11/00
152/209.13
4,836,262 A * 6/1989 Nishizawa ............ B60C 9/0007
152/451
(Continued)

FOREIGN PATENT DOCUMENTS

JP 62-152902 * 7/1987
JP 03-099903 * 4/1991
(Continued)

OTHER PUBLICATIONS

English machine translation of JP03-099903.*
(Continued)

*Primary Examiner* — Robert C Dye
(74) *Attorney, Agent, or Firm* — Thorpe North & Western

(57) ABSTRACT

A pneumatic tire is provided with at least three circumferential main grooves extending in a tire circumferential direction, and a plurality of land portions defined by the circumferential main grooves. The belt layer is formed by laminating a pair of cross belts having belt angles, as an absolute value, of not less than 10° and not greater than 45° and of mutually opposite signs, and a circumferential reinforcing layer having a belt angle within a range of ±5° with respect to the tire circumferential direction. In a cross-sectional view in the tire meridian direction, the distance Dcc from the circumferential reinforcing layer to the terminal wear surface on a tire equatorial plane and the distance De from an end portion of the circumferential reinforcing layer to the terminal wear surface have the relationship such that $De/Dcc \leq 0.94$.

34 Claims, 15 Drawing Sheets

(51) Int. Cl.
*B60C 11/04* (2006.01)
*B60C 9/20* (2006.01)
*B60C 9/18* (2006.01)
*B60C 11/00* (2006.01)
*B60C 3/04* (2006.01)

(52) U.S. Cl.
CPC .............. *B60C 9/2006* (2013.01); *B60C 9/28* (2013.01); *B60C 11/0083* (2013.01); *B60C 11/01* (2013.01); *B60C 2009/1828* (2013.01); *B60C 2009/1871* (2013.01); *B60C 2009/2061* (2013.01); *B60C 2009/2064* (2013.01)

(56) References Cited

U.S. PATENT DOCUMENTS

| | | | |
|---|---|---|---|
| 5,616,195 | A | 4/1997 | Marquet et al. |
| 5,779,828 | A * | 7/1998 | Okamoto ............... B60C 9/18 152/526 |
| 6,401,778 | B1 | 6/2002 | Cluzel |
| 6,401,780 | B1 * | 6/2002 | Patitsas .................. B60C 1/00 152/532 |
| 9,150,052 | B2 | 10/2015 | Mashiyama |
| 2004/0026000 | A1 * | 2/2004 | Shimizu .................. B60C 9/20 152/527 |
| 2006/0169380 | A1 | 8/2006 | Radulescu et al. |
| 2006/0169381 | A1 | 8/2006 | Radulescu et al. |
| 2006/0169383 | A1 | 8/2006 | Radulescu et al. |
| 2008/0000566 | A1 * | 1/2008 | Manno .................. B60C 9/2006 152/527 |
| 2009/0229722 | A1 * | 9/2009 | Isobe .................... B60C 9/2006 152/209.18 |
| 2009/0277552 | A1 * | 11/2009 | Maruyama ............... B60C 3/04 152/454 |
| 2009/0277557 | A1 * | 11/2009 | Suzuki ................. B60C 9/2006 152/532 |
| 2010/0116402 | A1 * | 5/2010 | Isobe .................... B60C 9/2006 152/526 |
| 2011/0220259 | A1 * | 9/2011 | Suzuki .................. B60C 11/00 152/209.18 |
| 2012/0097306 | A1 | 4/2012 | Delebecq et al. |
| 2012/0097307 | A1 | 4/2012 | Delebecq et al. |
| 2014/0305566 | A1 | 10/2014 | Mashiyama |
| 2014/0326375 | A1 * | 11/2014 | Okabe .................. B60C 9/0007 152/154.2 |
| 2014/0326380 | A1 | 11/2014 | Kotoku |

FOREIGN PATENT DOCUMENTS

| | | | |
|---|---|---|---|
| JP | H03-099903 | | 4/1991 |
| JP | H04-163208 | | 6/1992 |
| JP | H11-512050 | | 10/1999 |
| JP | 2002-103916 | * | 4/2002 |
| JP | 2007-131217 | | 5/2007 |
| JP | 4008013 | | 9/2007 |
| JP | 2008-001264 | | 1/2008 |
| JP | 4354114 | | 8/2009 |
| JP | 2010-013074 | | 1/2010 |
| JP | 4642760 | | 3/2011 |
| JP | 4663638 | | 4/2011 |
| JP | 4663639 | | 4/2011 |
| JP | 4918948 | | 4/2012 |
| JP | S49-018948 | | 4/2012 |
| JP | 4984013 | | 7/2012 |
| JP | 2012-522686 | | 9/2012 |
| JP | 2012-522687 | | 9/2012 |
| JP | 5029787 | * | 9/2012 |
| WO | WO 1997/07996 | | 3/1997 |
| WO | WO 2005/016666 | | 2/2005 |
| WO | WO 2005/016667 | | 2/2005 |
| WO | WO 2005/016668 | | 2/2005 |
| WO | WO 2007/148447 | | 12/2007 |
| WO | WO 2010/115891 | | 10/2010 |
| WO | WO 2010/115892 | | 10/2010 |
| WO | WO 2013/042255 | | 3/2013 |
| WO | WO 2013/042256 | | 3/2013 |

OTHER PUBLICATIONS

English machine translation of JP62-152902.*
English machine translation of JP2002-103916.*
International Search Report for International Application No. PCT/JP2012/084219 dated Mar. 5, 2013, 2 pages, Japan.

* cited by examiner

COMPARATIVE EXAMPLE
(De/Dcc=1.00, Gsh/Gcc=1.06)

WORKING EXAMPLE
(De/Dcc=0.92, Gsh/Gcc=1.20)

| | CONVENTIONAL EXAMPLE | COMPARATIVE EXAMPLE 1 | COMPARATIVE EXAMPLE 2 | WORKING EXAMPLE 1 | WORKING EXAMPLE 2 | WORKING EXAMPLE 3 | WORKING EXAMPLE 4 | WORKING EXAMPLE 5 |
|---|---|---|---|---|---|---|---|---|
| PRESENCE OF CIRCUMFERENTIAL REINFORCING LAYER | NO | YES | YES | YES | YES | YES | YES | YES |
| Gsh/Gcc | 1.06 | 1.06 | 1.24 | 1.06 | 1.10 | 1.20 | 1.25 | 1.20 |
| De/Dcc | - | 1.00 | 1.00 | 0.94 | 0.94 | 0.94 | 0.94 | 0.92 |
| Yc/Ya | 0.75 | 0.75 | 0.75 | 0.75 | 0.75 | 0.75 | 0.75 | 0.75 |
| Yd/Ya | 0.80 | 0.80 | 0.80 | 0.80 | 0.80 | 0.80 | 0.80 | 0.80 |
| (D2 − D3)/(D1 − D3) | 0.90 | 0.90 | 0.90 | 0.90 | 0.90 | 0.90 | 0.90 | 0.90 |
| Ws/Wca | - | 0.75 | 0.75 | 0.50 | 0.50 | 0.50 | 0.50 | 0.50 |
| Tw/Sw | 0.92 | 0.92 | 0.92 | 0.92 | 0.92 | 0.92 | 0.92 | 0.92 |
| Tw/Wca | 0.96 | 0.96 | 0.96 | 0.93 | 0.93 | 0.93 | 0.93 | 0.93 |
| He/Hcc | - | 0.88 | 0.88 | 1.02 | 1.02 | 1.02 | 1.02 | 1.02 |
| Dr/Ws | - | 0.020 | 0.020 | 0.020 | 0.020 | 0.020 | 0.020 | 0.020 |
| ANGLE OF LARGE ANGLE BELT (°) | 40 | 40 | 40 | 40 | 40 | 40 | 40 | 40 |
| NUMBER OF ENDS IN LARGE ANGLE BELT [Ends/50 mm] | 13 | 13 | 13 | 13 | 13 | 13 | 13 | 13 |
| Wb1/Wb3 | - | 0.80 | 0.80 | 0.80 | 0.80 | 0.80 | 0.80 | 0.80 |
| Es [MPa] | - | 4.0 | 4.0 | 4.0 | 4.0 | 4.0 | 4.0 | 4.0 |
| Es/E2 | - | 0.80 | 0.80 | 0.80 | 0.80 | 0.80 | 0.80 | 0.80 |
| Es/E3 | - | 0.80 | 0.80 | 0.80 | 0.80 | 0.80 | 0.80 | 0.80 |
| As[%] | - | 150 | 150 | 150 | 150 | 150 | 150 | 150 |
| λ1 [%] | 150 | 150 | 150 | 150 | 150 | 150 | 150 | 150 |
| Ebc [MPa] | 1.2 | 1.2 | 1.2 | 1.2 | 1.2 | 1.2 | 1.2 | 1.2 |
| λbc [%] | 300 | 300 | 300 | 300 | 300 | 300 | 300 | 300 |
| Dc[mm] | - | 0.40 | 0.40 | 0.40 | 0.40 | 0.40 | 0.40 | 0.40 |
| BELT-EDGE-SEPARATION RESISTANCE PERFORMANCE | 100 | 103 | 104 | 104 | 104 | 104 | 104 | 105 |

FIG. 8A

| | WORKING EXAMPLE 6 | WORKING EXAMPLE 7 | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 | WORKING EXAMPLE 14 |
|---|---|---|---|---|---|---|---|---|---|
| PRESENCE OF CIRCUMFERENTIAL REINFORCING LAYER | YES | YES | YES | YES | YES | YES | YES | YES | YES |
| Gsh/Gcc | 1.25 | 1.25 | 1.25 | 1.25 | 1.25 | 1.25 | 1.20 | 1.25 | 1.25 |
| De/Dcc | 0.90 | 0.85 | 0.80 | 0.85 | 0.85 | 0.85 | 0.92 | 0.85 | 0.85 |
| Yc/Ya | 0.75 | 0.75 | 0.75 | 0.80 | 0.85 | 0.90 | 0.85 | 0.85 | 0.85 |
| Yd/Ya | 0.80 | 0.80 | 0.80 | 0.90 | 0.80 | 0.80 | 0.95 | 0.95 | 1.02 |
| (D2 − D3)/(D1 − D3) | 0.90 | 0.90 | 0.90 | 0.90 | 0.90 | 0.90 | 0.90 | 0.90 | 0.90 |
| Ws/Wca | 0.50 | 0.50 | 0.50 | 0.50 | 0.50 | 0.50 | 0.50 | 0.50 | 0.50 |
| TW/SW | 0.92 | 0.92 | 0.92 | 0.92 | 0.92 | 0.92 | 0.92 | 0.92 | 0.92 |
| TW/Wca | 0.93 | 0.93 | 0.93 | 0.93 | 0.93 | 0.93 | 0.93 | 0.93 | 0.93 |
| He/Hcc | 1.02 | 1.02 | 1.02 | 1.02 | 1.02 | 1.02 | 1.02 | 1.02 | 1.02 |
| Dr/Ws | 0.020 | 0.020 | 0.020 | 0.020 | 0.020 | 0.020 | 0.020 | 0.020 | 0.020 |
| ANGLE OF LARGE ANGLE BELT (°) | 40 | 40 | 40 | 40 | 40 | 40 | 40 | 40 | 40 |
| NUMBER OF ENDS IN LARGE ANGLE BELT [Ends/50 mm] | 13 | 13 | 13 | 13 | 13 | 13 | 13 | 13 | 13 |
| Wb1/Wb3 | 0.80 | 0.80 | 0.80 | 0.80 | 0.80 | 0.80 | 0.80 | 0.80 | 0.80 |
| Es [MPa] | 4.0 | 4.0 | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 | 0.80 | 0.80 |
| As[%] | 150 | 150 | 150 | 150 | 150 | 150 | 150 | 150 | 150 |
| A1 [%] | 150 | 150 | 150 | 150 | 150 | 150 | 150 | 150 | 150 |
| Ebc [MPa] | 1.2 | 1.2 | 1.2 | 1.2 | 1.2 | 1.2 | 1.2 | 1.2 | 1.2 |
| Abc [%] | 300 | 300 | 300 | 300 | 300 | 300 | 300 | 300 | 300 |
| Dc[mm] | 0.40 | 0.40 | 0.40 | 0.40 | 0.40 | 0.40 | 0.40 | 0.40 | 0.40 |
| BELT-EDGE-SEPARATION RESISTANCE PERFORMANCE | 105 | 107 | 106 | 108 | 109 | 108 | 111 | 112 | 110 |

FIG. 8B

| | WORKING EXAMPLE 15 | WORKING EXAMPLE 16 | WORKING EXAMPLE 17 | WORKING EXAMPLE 18 | WORKING EXAMPLE 19 | WORKING EXAMPLE 20 | WORKING EXAMPLE 21 | WORKING EXAMPLE 22 |
|---|---|---|---|---|---|---|---|---|
| PRESENCE OF CIRCUMFERENTIAL REINFORCING LAYER | YES | YES | YES | YES | YES | YES | YES | YES |
| Gsh/Gcc | 1.25 | 1.25 | 1.25 | 1.20 | 1.25 | 1.25 | 1.25 | 1.25 |
| De/Dcc | 0.85 | 0.85 | 0.85 | 0.92 | 0.85 | 0.85 | 0.85 | 0.85 |
| Yc/Ya | 0.85 | 0.85 | 0.85 | 0.85 | 0.85 | 0.85 | 0.85 | 0.85 |
| Yd/Ya | 0.95 | 0.95 | 0.95 | 0.95 | 0.95 | 0.95 | 0.95 | 0.95 |
| (D2 − D3)/(D1 − D3) | 0.85 | 0.50 | −0.65 | 0.50 | 0.50 | 0.50 | 0.50 | 0.50 |
| Ws/Wca | 0.50 | 0.50 | 0.50 | 0.50 | 0.60 | 0.65 | 0.70 | 0.65 |
| TW/SW | 0.92 | 0.92 | 0.92 | 0.92 | 0.92 | 0.92 | 0.92 | 0.80 |
| TW/Wca | 0.93 | 0.93 | 0.93 | 0.93 | 0.93 | 0.93 | 0.93 | 0.93 |
| He/Hcc | 1.02 | 1.02 | 1.02 | 1.02 | 1.02 | 1.02 | 1.02 | 1.02 |
| Dr/Ws | 0.020 | 0.020 | 0.020 | 0.020 | 0.020 | 0.020 | 0.020 | 0.020 |
| ANGLE OF LARGE ANGLE BELT (°) | 40 | 40 | 40 | 40 | 40 | 40 | 40 | 40 |
| NUMBER OF ENDS IN LARGE ANGLE BELT [Ends/50 mm] | 13 | 13 | 13 | 13 | 13 | 13 | 13 | 13 |
| Wb1/Wb3 | 0.80 | 0.80 | 0.80 | 0.80 | 0.80 | 0.80 | 0.80 | 0.80 |
| Es [MPa] | 4.0 | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 | 0.80 |
| λs [%] | 150 | 150 | 150 | 150 | 150 | 150 | 150 | 150 |
| λ1 [%] | 150 | 150 | 150 | 150 | 150 | 150 | 150 | 150 |
| Ebc [MPa] | 1.2 | 1.2 | 1.2 | 1.2 | 1.2 | 1.2 | 1.2 | 1.2 |
| Abc [%] | 300 | 300 | 300 | 300 | 300 | 300 | 300 | 300 |
| Dc [mm] | 0.40 | 0.40 | 0.40 | 0.40 | 0.40 | 0.40 | 0.40 | 0.40 |
| BELT-EDGE-SEPARATION RESISTANCE PERFORMANCE | 113 | 115 | 114 | 116 | 117 | 118 | 117 | 118 |

FIG. 9A

| | WORKING EXAMPLE 23 | WORKING EXAMPLE 24 | WORKING EXAMPLE 25 | WORKING EXAMPLE 26 | WORKING EXAMPLE 27 | WORKING EXAMPLE 28 | WORKING EXAMPLE 29 |
|---|---|---|---|---|---|---|---|
| PRESENCE OF CIRCUMFERENTIAL REINFORCING LAYER | YES | YES | YES | YES | YES | YES | YES |
| Gsh/Gcc | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 |
| Yc/Ya | 0.85 | 0.85 | 0.85 | 0.85 | 0.85 | 0.85 | 0.85 |
| Yd/Ya | 0.95 | 0.95 | 0.95 | 0.95 | 0.95 | 0.95 | 0.95 |
| (D2 − D3)/(D1 − D3) | 0.50 | 0.50 | 0.50 | 0.50 | 0.50 | 0.50 | 0.50 |
| Ws/Wca | 0.65 | 0.65 | 0.65 | 0.65 | 0.65 | 0.65 | 0.65 |
| TW/SW | 0.87 | 0.89 | 0.92 | 0.92 | 0.92 | 0.92 | 0.92 |
| TW/Wca | 0.93 | 0.93 | 0.91 | 0.82 | 0.91 | 0.91 | 0.91 |
| He/Hcc | 1.02 | 1.02 | 1.02 | 1.02 | 0.97 | 0.92 | 0.87 |
| Dr/Ws | 0.020 | 0.020 | 0.020 | 0.020 | 0.020 | 0.020 | 0.020 |
| ANGLE OF LARGE ANGLE BELT (°) | 40 | 40 | 40 | 40 | 40 | 40 | 40 |
| NUMBER OF ENDS IN LARGE ANGLE BELT [Ends/50 mm] | 13 | 13 | 13 | 13 | 13 | 13 | 13 |
| Wb1/Wb3 | 0.80 | 0.80 | 0.80 | 0.80 | 0.80 | 0.80 | 0.80 |
| Es [MPa] | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 |
| As [%] | 150 | 150 | 150 | 150 | 150 | 150 | 150 |
| λ1 [%] | 150 | 150 | 150 | 150 | 150 | 150 | 150 |
| Ebc [MPa] | 1.2 | 1.2 | 1.2 | 1.2 | 1.2 | 1.2 | 1.2 |
| λbc [%] | 300 | 300 | 300 | 300 | 300 | 300 | 300 |
| Dc [mm] | 0.40 | 0.40 | 0.40 | 0.40 | 0.40 | 0.40 | 0.40 |
| BELT-EDGE-SEPARATION RESISTANCE PERFORMANCE | 119 | 118 | 119 | 118 | 120 | 122 | 121 |

FIG. 10B

|  | WORKING EXAMPLE 30 | WORKING EXAMPLE 31 | WORKING EXAMPLE 32 | WORKING EXAMPLE 33 | WORKING EXAMPLE 34 | WORKING EXAMPLE 35 | WORKING EXAMPLE 36 | WORKING EXAMPLE 37 |
|---|---|---|---|---|---|---|---|---|
| PRESENCE OF CIRCUMFERENTIAL REINFORCING LAYER | YES | YES | YES | YES | YES | YES | YES | YES |
| Gsh/Gcc | 1.25 | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 | 0.85 |
| Yc/Ya | 0.85 | 0.85 | 0.85 | 0.85 | 0.85 | 0.85 | 0.85 | 0.85 |
| Yd/Ya | 0.95 | 0.95 | 0.95 | 0.95 | 0.95 | 0.95 | 0.95 | 0.95 |
| (D2 − D3)/(D1 − D3) | 0.50 | 0.50 | 0.50 | 0.50 | 0.50 | 0.50 | 0.50 | 0.50 |
| Ws/Wca | 0.65 | 0.65 | 0.65 | 0.65 | 0.65 | 0.65 | 0.65 | 0.65 |
| Tw/Sw | 0.92 | 0.92 | 0.92 | 0.92 | 0.92 | 0.92 | 0.92 | 0.92 |
| Tw/Wca | 0.91 | 0.91 | 0.91 | 0.91 | 0.91 | 0.91 | 0.91 | 0.91 |
| He/Hcc | 0.92 | 0.92 | 0.92 | 0.92 | 0.92 | 0.92 | 0.92 | 0.92 |
| Dr/Ws | 0.010 | 0.005 | 0.000 | −0.100 | 0.005 | 0.005 | 0.005 | 0.005 |
| ANGLE OF LARGE ANGLE BELT (°) | 40 | 40 | 40 | 40 | 45 | 60 | 70 | 60 |
| NUMBER OF ENDS IN LARGE ANGLE BELT [Ends/50 mm] | 13 | 13 | 13 | 13 | 13 | 13 | 13 | 15 |
| Wb1/Wb3 | 0.80 | 0.80 | 0.80 | 0.80 | 0.80 | 0.80 | 0.80 | 0.80 |
| Es [MPa] | 4.0 | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 | 0.80 |
| As [%] | 150 | 150 | 150 | 150 | 150 | 150 | 150 | 150 |
| λ1 [%] | 150 | 150 | 150 | 150 | 150 | 150 | 150 | 150 |
| Ebc [MPa] | 1.2 | 1.2 | 1.2 | 1.2 | 1.2 | 1.2 | 1.2 | 1.2 |
| Abc [%] | 300 | 300 | 300 | 300 | 300 | 300 | 300 | 300 |
| Dc [mm] | 0.40 | 0.40 | 0.40 | 0.40 | 0.40 | 0.40 | 0.40 | 0.40 |
| BELT-EDGE-SEPARATION RESISTANCE PERFORMANCE | 122 | 124 | 123 | 122 | 124 | 127 | 126 | 128 |

FIG. 10A

| | WORKING EXAMPLE 38 | WORKING EXAMPLE 39 | WORKING EXAMPLE 40 | WORKING EXAMPLE 41 | WORKING EXAMPLE 42 | WORKING EXAMPLE 43 | WORKING EXAMPLE 44 | WORKING EXAMPLE 45 |
|---|---|---|---|---|---|---|---|---|
| PRESENCE OF CIRCUMFERENTIAL REINFORCING LAYER | YES | YES | YES | YES | YES | YES | YES | YES |
| Gsh/Gcc | 1.25 | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 | 0.85 |
| Yc/Ya | 0.85 | 0.85 | 0.85 | 0.85 | 0.85 | 0.85 | 0.85 | 0.85 |
| Yd/Ya | 0.95 | 0.95 | 0.95 | 0.95 | 0.95 | 0.95 | 0.95 | 0.95 |
| (D2 − D3)/(D1 − D3) | 0.50 | 0.50 | 0.50 | 0.50 | 0.50 | 0.50 | 0.50 | 0.50 |
| Ws/Wca | 0.65 | 0.65 | 0.65 | 0.65 | 0.65 | 0.65 | 0.65 | 0.65 |
| TW/SW | 0.92 | 0.92 | 0.92 | 0.92 | 0.92 | 0.92 | 0.92 | 0.92 |
| TW/Wca | 0.91 | 0.91 | 0.91 | 0.91 | 0.91 | 0.91 | 0.91 | 0.91 |
| He/Hcc | 0.92 | 0.92 | 0.92 | 0.92 | 0.92 | 0.92 | 0.92 | 0.92 |
| Dr/Ws | 0.005 | 0.005 | 0.005 | 0.005 | 0.005 | 0.005 | 0.005 | 0.005 |
| ANGLE OF LARGE ANGLE BELT (°) | 60 | 60 | 60 | 60 | 60 | 60 | 60 | 60 |
| NUMBER OF ENDS IN LARGE ANGLE BELT [Ends/50 mm] | 20 | 25 | 20 | 20 | 20 | 20 | 20 | 20 |
| Wb1/Wb3 | 0.80 | 0.80 | 0.85 | 0.95 | 1.05 | 0.95 | 0.95 | 0.95 |
| Es [MPa] | 4.0 | 4.0 | 4.0 | 4.0 | 4.0 | 4.5 | 6.0 | 7.5 |
| Es/E2 | 0.80 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 | 0.80 |
| As [%] | 150 | 150 | 150 | 150 | 150 | 150 | 150 | 150 |
| λ1 [%] | 150 | 150 | 150 | 150 | 150 | 150 | 150 | 150 |
| Ebc [MPa] | 1.2 | 1.2 | 1.2 | 1.2 | 1.2 | 1.2 | 1.2 | 1.2 |
| Abc [%] | 300 | 300 | 300 | 300 | 300 | 300 | 300 | 300 |
| Dc [mm] | 0.40 | 0.40 | 0.40 | 0.40 | 0.40 | 0.40 | 0.40 | 0.40 |
| BELT-EDGE-SEPARATION RESISTANCE PERFORMANCE | 130 | 129 | 131 | 132 | 131 | 133 | 134 | 133 |

FIG. 10B

|  | WORKING EXAMPLE 46 | WORKING EXAMPLE 47 | WORKING EXAMPLE 48 | WORKING EXAMPLE 49 | WORKING EXAMPLE 50 | WORKING EXAMPLE 51 | WORKING EXAMPLE 52 | WORKING EXAMPLE 53 |
|---|---|---|---|---|---|---|---|---|
| PRESENCE OF CIRCUMFERENTIAL REINFORCING LAYER | YES | YES | YES | YES | YES | YES | YES | YES |
| Gsh/Gcc | 1.25 | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 | 0.85 |
| Yc/Ya | 0.85 | 0.85 | 0.85 | 0.85 | 0.85 | 0.85 | 0.85 | 0.85 |
| Yd/Ya | 0.95 | 0.95 | 0.95 | 0.95 | 0.95 | 0.95 | 0.95 | 0.95 |
| (D2 − D3)/(D1 − D3) | 0.50 | 0.50 | 0.50 | 0.50 | 0.50 | 0.50 | 0.50 | 0.50 |
| Ws/Wca | 0.65 | 0.65 | 0.65 | 0.65 | 0.65 | 0.65 | 0.65 | 0.65 |
| TW/SW | 0.92 | 0.92 | 0.92 | 0.92 | 0.92 | 0.92 | 0.92 | 0.92 |
| TW/Wca | 0.91 | 0.91 | 0.91 | 0.91 | 0.91 | 0.91 | 0.91 | 0.91 |
| He/Hcc | 0.92 | 0.92 | 0.92 | 0.92 | 0.92 | 0.92 | 0.92 | 0.92 |
| Dr/Ws | 0.005 | 0.005 | 0.005 | 0.005 | 0.005 | 0.005 | 0.005 | 0.005 |
| ANGLE OF LARGE ANGLE BELT (°) | 60 | 60 | 60 | 60 | 60 | 60 | 60 | 60 |
| NUMBER OF ENDS IN LARGE ANGLE BELT [Ends/50 mm] | 20 | 20 | 20 | 20 | 20 | 20 | 20 | 20 |
| Wb1/Wb3 | 0.95 | 0.95 | 0.95 | 0.95 | 0.95 | 0.95 | 0.95 | 0.95 |
| Es [MPa] | 6.0 | 6.0 | 6.0 | 6.0 | 6.0 | 6.0 | 6.0 | 6.0 |
| Es/E2 | 0.90 | 1.00 | 1.10 | 1.00 | 1.00 | 1.00 | 1.00 | 1.00 |
| Es/E3 | 0.90 | 1.00 | 1.10 | 1.00 | 1.00 | 1.00 | 1.00 | 1.00 |
| As [%] | 150 | 150 | 150 | 200 | 250 | 250 | 250 | 250 |
| A1 [%] | 150 | 150 | 150 | 150 | 150 | 200 | 250 | 250 |
| Ebc [MPa] | 1.2 | 1.2 | 1.2 | 1.2 | 1.2 | 1.2 | 1.2 | 1.5 |
| Abc [%] | 300 | 300 | 300 | 300 | 300 | 300 | 300 | 300 |
| Dc [mm] | 0.40 | 0.40 | 0.40 | 0.40 | 0.40 | 0.40 | 0.40 | 0.40 |
| BELT-EDGE-SEPARATION RESISTANCE PERFORMANCE | 135 | 136 | 135 | 137 | 138 | 139 | 140 | 141 |

| | WORKING EXAMPLE 54 | WORKING EXAMPLE 55 | WORKING EXAMPLE 56 | WORKING EXAMPLE 57 | WORKING EXAMPLE 58 | WORKING EXAMPLE 59 | WORKING EXAMPLE 60 |
|---|---|---|---|---|---|---|---|
| PRESENCE OF CIRCUMFERENTIAL REINFORCING LAYER | YES | YES | YES | YES | YES | YES | YES |
| Gsh/Gcc | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 |
| Yc/Ya | 0.85 | 0.85 | 0.85 | 0.85 | 0.85 | 0.85 | 0.85 |
| Yd/Ya | 0.95 | 0.95 | 0.95 | 0.95 | 0.95 | 0.95 | 0.95 |
| (D2 − D3)/(D1 − D3) | 0.50 | 0.50 | 0.50 | 0.50 | 0.50 | 0.50 | 0.50 |
| Ws/Wca | 0.65 | 0.65 | 0.65 | 0.65 | 0.65 | 0.65 | 0.65 |
| TW/SW | 0.92 | 0.92 | 0.92 | 0.92 | 0.92 | 0.92 | 0.92 |
| TW/Wca | 0.91 | 0.91 | 0.91 | 0.91 | 0.91 | 0.91 | 0.91 |
| He/Hcc | 0.92 | 0.92 | 0.92 | 0.92 | 0.92 | 0.92 | 0.92 |
| Dr/Ws | 0.005 | 0.005 | 0.005 | 0.005 | 0.005 | 0.005 | 0.005 |
| ANGLE OF LARGE ANGLE BELT (°) | 60 | 60 | 60 | 60 | 60 | 60 | 60 |
| NUMBER OF ENDS IN LARGE ANGLE BELT [Ends/50 mm] | 20 | 20 | 20 | 20 | 20 | 20 | 20 |
| Wb1/Wb3 | 0.95 | 0.95 | 0.95 | 0.95 | 0.95 | 0.95 | 0.95 |
| Es [MPa] | 6.0 | 6.0 | 6.0 | 6.0 | 6.0 | 6.0 | 6.0 |
| Es/E2 | 1.00 | 1.00 | 1.00 | 1.00 | 1.00 | 1.00 | 1.00 |
| Es/E3 | 1.00 | 1.00 | 1.00 | 1.00 | 1.00 | 1.00 | 1.00 |
| As [%] | 250 | 250 | 250 | 250 | 250 | 250 | 250 |
| A1 [%] | 250 | 250 | 250 | 250 | 250 | 250 | 250 |
| Ebc [MPa] | 2.3 | 3.0 | 2.3 | 2.3 | 2.3 | 2.3 | 2.3 |
| Abc [%] | 300 | 300 | 400 | 470 | 470 | 470 | 470 |
| Dc [mm] | 0.40 | 0.40 | 0.40 | 0.40 | 0.50 | 1.00 | 1.50 |
| BELT-EDGE-SEPARATION RESISTANCE PERFORMANCE | 143 | 142 | 144 | 146 | 147 | 149 | 148 |

PNEUMATIC TIRE

TECHNICAL FIELD

The present technology relates to a pneumatic tire, and more particularly relates to a pneumatic tire with improved belt-edge-separation resistance performance.

BACKGROUND

Recent heavy duty tires mounted on trucks, buses, and the like maintain the shape of the tread portion due to the tires having a low aspect ratio while having a circumferential reinforcing layer disposed in the belt layer. The circumferential reinforcing layer is a belt ply having a belt angle that is substantially 0° with respect to the tire circumferential direction, and is disposed laminated upon a pair of cross belts. The technologies disclosed in Japanese Patent Nos. 4642760, 4663638 and 4663639, as well as in Japanese Unexamined Patent Application Publication No. 2012-522686, are conventional pneumatic tires that are configured in this manner.

Here, in the pneumatic tire, there is a problem that it is necessary to suppress separation of the peripheral rubber at an end portion of a belt ply.

SUMMARY

The present technology provides a pneumatic tire with improved belt-edge-separation resistance performance.

A pneumatic tire according to the present technology includes a carcass layer, a belt layer disposed outward of the carcass layer in a tire radial direction, a tread rubber disposed outward of the belt layer in the tire radial direction, at least three circumferential main grooves extending in a tire circumferential direction, and a plurality of land portions partitioned by the circumferential main grooves. The belt layer is formed by laminating a pair of cross belts having belt angles, as an absolute value, of not less than 10° and not greater than 45° and of mutually opposite signs, and a circumferential reinforcing layer having a belt angle within a range of ±5° with respect to the tire circumferential direction. When viewed as a cross-section from a tire meridian direction, when a wear end surface WE of the circumferential main grooves is drawn, a distance Dcc from the circumferential reinforcing layer to the wear end surface WE along a tire equatorial plane and a distance De from an end portion of the circumferential reinforcing layer to the wear end surface WE have a relationship such that De/Dcc≤0.94. A diameter Ya at the highest position of the carcass layer and a diameter Yd of the carcass layer at a position of the end portion of the circumferential reinforcing layer have a relationship such that 0.95≤Yd/Ya≤1.02.

In the pneumatic tire according to the present technology, as the distances Dcc and De of the circumferential reinforcing layer with respect to the wear end surface (WE) are made appropriate, strain of the circumferential reinforcing layer is reduced when the tire contacts the ground. Furthermore, as the diameter Yd of the carcass layer at the position of the end portion of the circumferential reinforcing layer is made appropriate, the amount of deformation of the carcass layer in a region where the circumferential reinforcing layer is disposed is reduced when the tire contacts the ground. Accordingly, there is an advantage that separation of the peripheral rubber of the circumferential reinforcing layer is suppressed.

BRIEF DESCRIPTION OF THE DRAWINGS

FIGS. 8A-8B include a table showing results of performance testing of pneumatic tires according to embodiments of the present technology.

FIGS. 9A-9B include a table showing results of performance testing of pneumatic tires according to embodiments of the present technology.

FIGS. 10A-10B include a table showing results of performance testing of pneumatic tires according to embodiments of the present technology.

FIGS. 11A-11B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiments can be freely combined within a scope of obviousness for a person skilled in the art.

Pneumatic Tire

Figure 1:
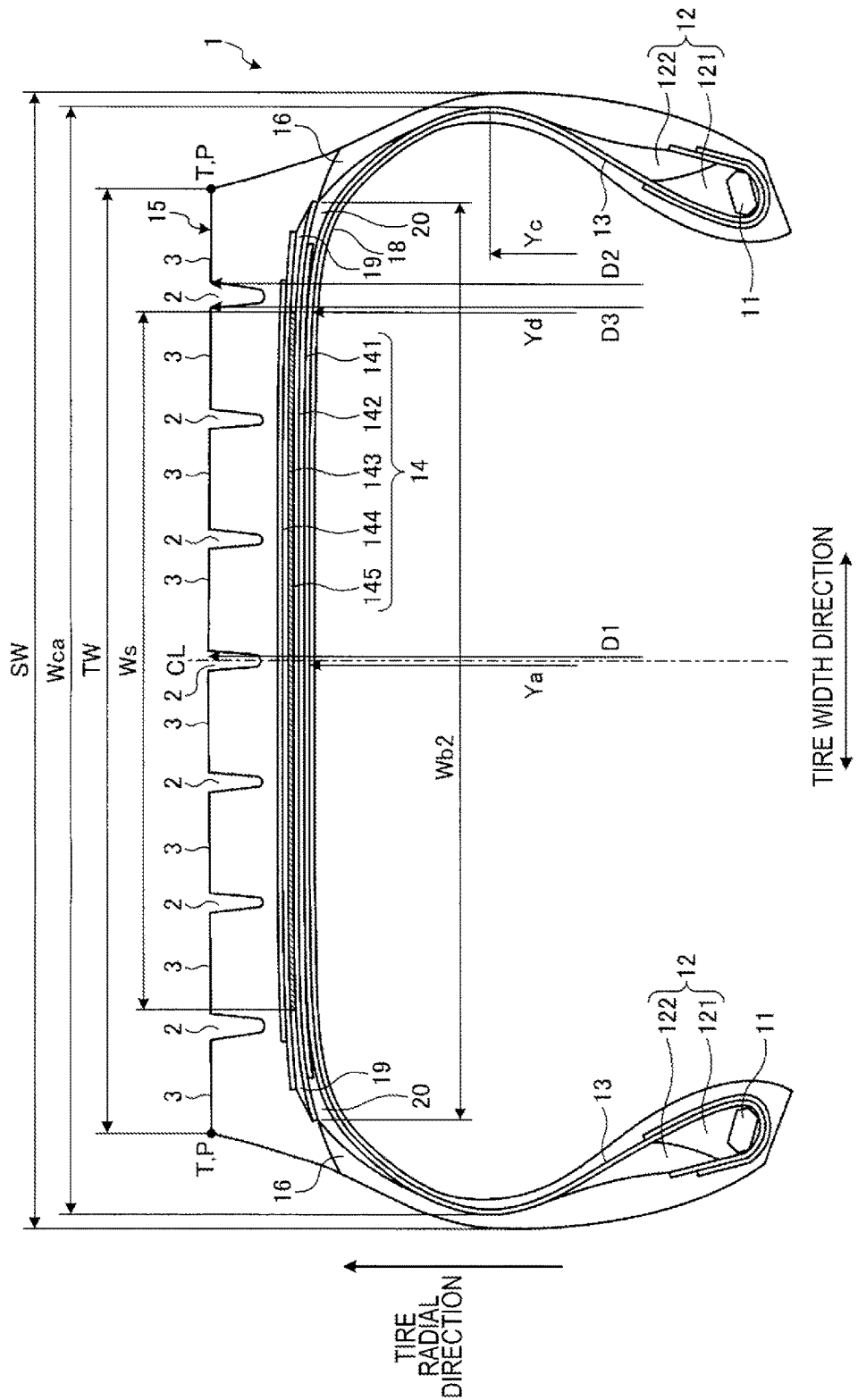
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equatorial plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and constitute cores of left and right bead portions. The pair of bead fillers 12, 12 are formed from a lower filler 121 and an upper filler 122, and are disposed to a periphery of both of the pair of bead cores 11, 11 in the tire radial direction so as to reinforce the bead portions.

The carcass layer 13 extends between the left and right side bead cores 11 and 11 in a toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fiber material (e.g. nylon, polyester, rayon, or the like) covered by a coating rubber and subjected to a rolling process, and has a carcass angle (inclination angle of the fiber direction of the carcass cord with respect to the tire circumferential direction), as an absolute value, of not less than 85° and not greater than 95°.

The belt layer 14 is formed by laminating a plurality of belt plies 141 to 145, and disposed wound over a periphery of the carcass layer 13. A detailed configuration of the belt layer 14 is described below.

The tread rubber 15 is disposed to the periphery in the tire radial direction of the carcass layer 13 and the belt layer 14, and forms a tread portion of the tire. The pair of side wall rubbers 16, 16 is disposed outward of the carcass layer 13 in the tire width direction, so as to form left and right side wall portions.

In the configuration illustrated in FIG. 1, the pneumatic tire 1 includes seven circumferential main grooves 2 that extend in a tire circumferential direction, and eight land portions 3 partitioned by the circumferential main grooves 2. The land portions 3 are formed of blocks that are segmented in the tire circumferential direction by lug grooves (not illustrated) or formed of ribs that continue in the tire circumferential direction.

Here, "circumferential main grooves" refers to circumferential grooves having a groove width of 5.0 mm or greater. The groove width of the circumferential main grooves is measured excluding notched portions and/or chamfered portions formed at the groove opening portion.

Additionally, in the pneumatic tire 1, the left and right circumferential main grooves 2, 2 located furthest out in the tire width direction are referred to as outermost circumferential main grooves. Moreover, the left and right land portions 3, 3 located outward in the tire width direction that are defined by the left and right outermost circumferential main grooves 2, 2 are referred to as shoulder land portions.

Belt Layer

Figure 2:
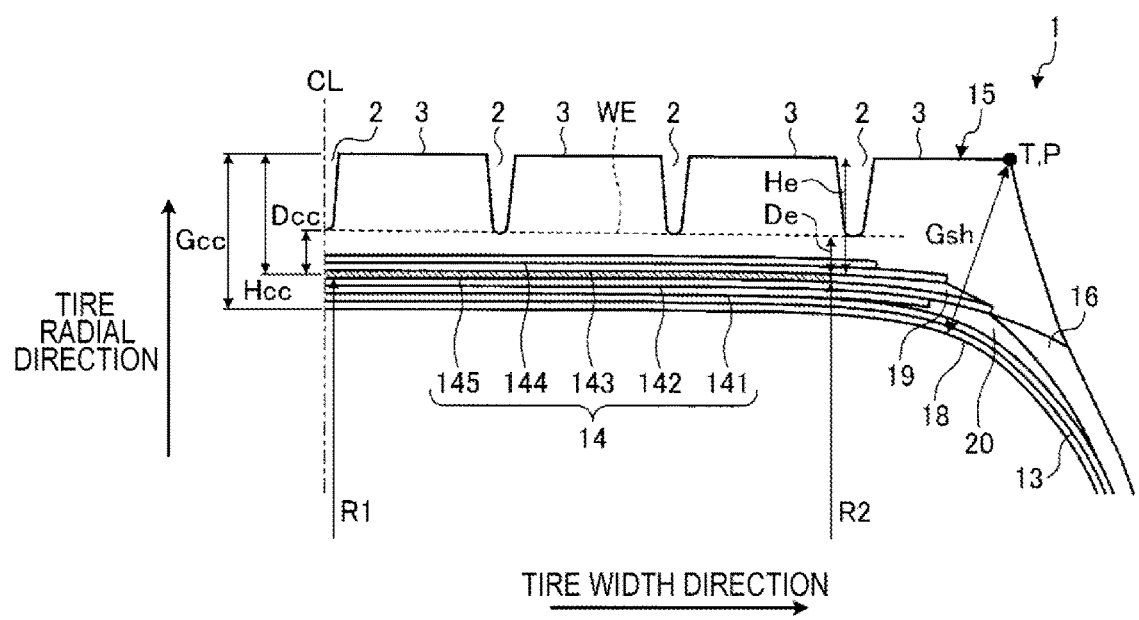
FIG. 2 is an explanatory view illustrating a belt layer of the pneumatic tire depicted in FIG. 1.
Figure 3:
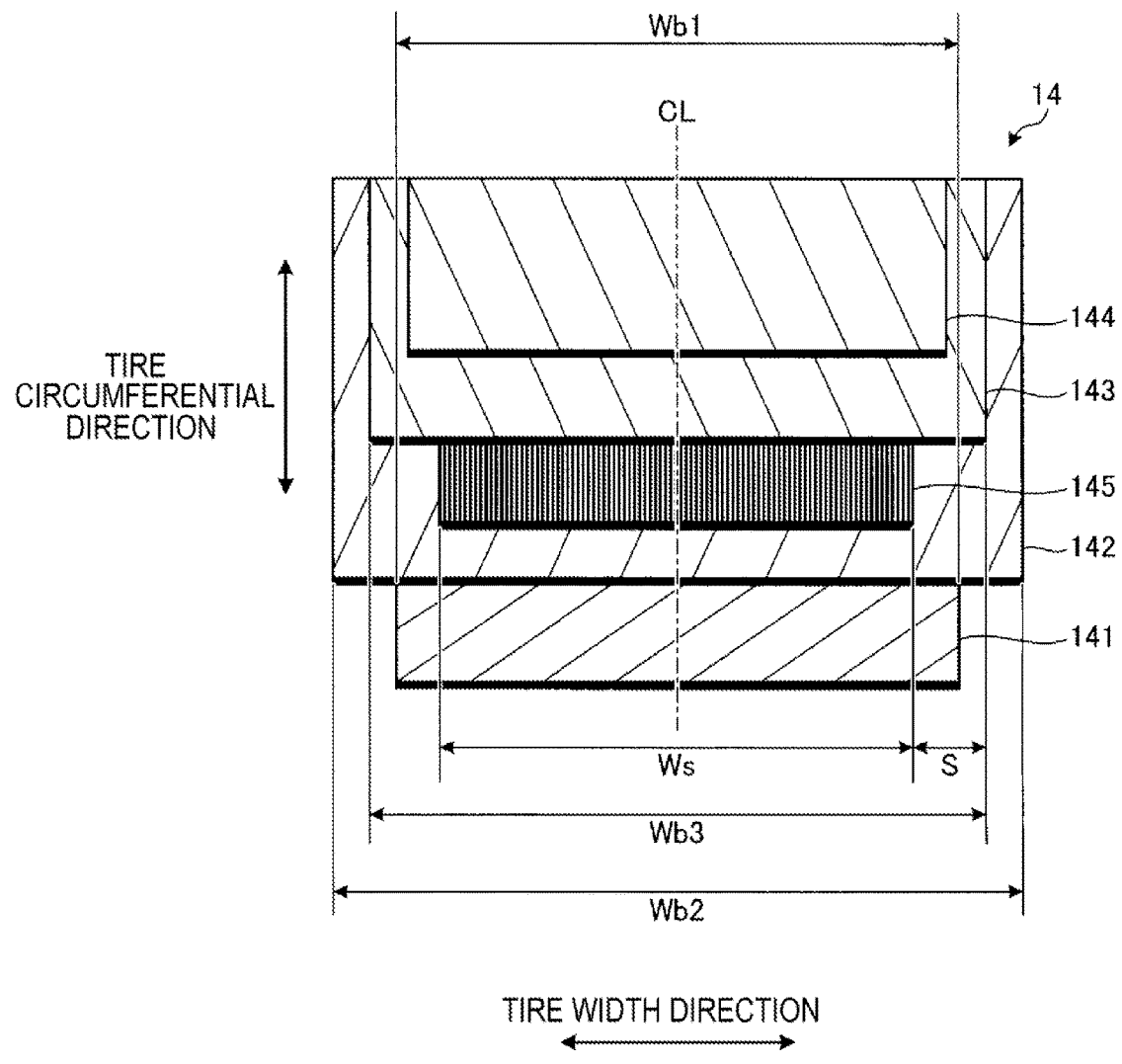
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed wound over the periphery of the carcass layer 13 (see FIG. 2).

The large angle belt 141 is constituted by a plurality of belt cords formed from steel or organic fiber material, covered by coating rubber, and subjected to a rolling process, and has a belt angle (angle of inclination of the fiber direction of the belt cords with respect to the tire circumferential direction), as an absolute value, of not less than 45° and not greater than 70°. Moreover, the large angle belt 141 is disposed laminated outward in the tire radial direction of the carcass layer 13.

The pair of cross belts 142, 143 are constituted by a plurality of belt cords formed from steel or organic fiber material, covered by coating rubber, and subjected to a rolling process, having a belt angle, as an absolute value, of not less than 10° and not greater than 45°. Additionally, the pair of cross belts 142, 143 have belt angles that are of mutually opposite signs to each other, and are laminated so that the fiber direction of the respective belt cords intersect each other (a crossply structure). In the following description, the cross belt 142 positioned inward in the tire radial direction is referred to as "inner-side cross belt", and the cross belt 143 positioned outward in the tire radial direction is referred to as "outer-side cross belt". Three or more cross belts may be disposed laminated (not illustrated). Furthermore, in the present embodiment, the pair of cross belts 142, 143 is disposed laminated outward in the tire radial direction of the large angle belt 141.

Also, the belt cover 144 is constituted by a plurality of belt cords formed from steel or organic fiber material, covered by coating rubber, and subjected to a rolling process, having a belt angle, as an absolute value, of not less than 10° and not greater than 45°. Furthermore, the belt cover 144 is disposed laminated outward in the tire radial direction of the pair of cross belts 142, 143. In this embodiment, the belt cover 144 has the same belt angle as the outer-side cross belt 143, and is disposed in the outermost layer of the belt layer 14.

The circumferential reinforcing layer 145 is constituted by coating rubber covered steel belt cords that are wound in a spiral manner with an inclination within a range of ±5° with respect to the tire circumferential direction. Furthermore, in the present embodiment, the circumferential reinforcing layer 145 is disposed interposed between the pair of cross belts 142, 143. Additionally, the circumferential reinforcing layer 145 is disposed inward in the tire width direction from the left and right edge portion of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability performance is improved.

In the pneumatic tire 1, the belt layer 14 may have an edge cover (not illustrated). Generally, the edge cover is constituted by a plurality of belt cords formed from steel or organic fiber material, covered by coating rubber, and subjected to a rolling process, having a belt angle, as an absolute value, of not less than 0° and not greater than 5°. Additionally, edge covers are disposed outward in the tire radial direction of the left and right edge portion of the outer-side cross belt 143 (or the inner-side cross belt 142). The difference in radial growth between the center region and the shoulder region of the tread portion is reduced and uneven wear resistance of the tire is improved due to a hoop effect demonstrated by the edge covers.

Additionally, in the configuration in FIG. 2, the circumferential reinforcing layer 145 is disposed interposed between the pair of cross belts 142, 143 (see FIG. 2). However, the circumferential reinforcing layer 145 is not limited as such, and may also disposed outward in the tire radial direction of the pair of cross belts 142, 143 (not illustrated). Additionally, the circumferential reinforcing layer 145 may also be disposed inward of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated).

Improvement of Belt-Edge-Separation Resistance Performance

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the center region of the tread portion, and utilizing the hoop effect, radial growth of the tread is suppressed and the shape of the tread portion is maintained.

In such a configuration, as the stiffness of the belt layer in the tire circumferential direction is increased due to the circumferential reinforcing layer, there is a problem that separation of the peripheral rubber at the edge portion of the belt ply tends to occur. Such a problem clearly appears, in particular, under high internal pressure and heavy load long-term service conditions.

Here, in the pneumatic tire 1, the configuration described below is adopted in order to improve tire durability performance by suppressing the occurrence of the above-described separation (see FIG. 1 to FIG. 3).

First, when viewed as a cross-section from the tire meridian direction, a wear end surface WE of the circumferential main grooves 2 is drawn, as illustrated in FIG. 2. The wear end surface WE refers to the surface estimated from a wear indicator present in the tire. Additionally, the wear end surface WE is measured under the condition of a single tire with the tire in a non-inflated state. In a typical pneumatic tire, the wear end surface WE is on a curve that is roughly parallel with the tread profile.

At this time, a distance Dcc from the circumferential reinforcing layer 145 to the wear end surface WE along the tire equatorial plane CL and a distance De from an end portion of the circumferential reinforcing layer 145 to the wear end surface WE preferably have a relationship such that De/Dcc≤0.94 and more preferably have a relationship such that De/Dcc≤0.92. The lower limit of the De/Dcc ratio is not particularly limited, but it is subjected to restrictions in relation to a distance between the outermost belt layer and the wear end surface WE. For example, the lower limit of the De/Dcc ratio is preferably not less than 0.65.

The distance Dcc and distance De are measured under the condition of a single tire with the tire in a non-inflated state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined with reference to the belt cord located furthest out in the tire width direction among the belt cords that constitute the circumferential reinforcing layer 145.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified internal pressure is an air pressure of 180 kPa, and the specified load is 88% of the maximum load capacity.

Moreover, the distance Gcc from the tread profile to the tire inner circumferential surface at the tire equatorial plane CL and the distance Gsh from the tread edge P to the tire inner circumferential surface preferably have a relationship such that 1.10≤Gsh/Gcc, and more preferably have a relationship such that 1.20≤Gsh/Gcc.

Figure 5:
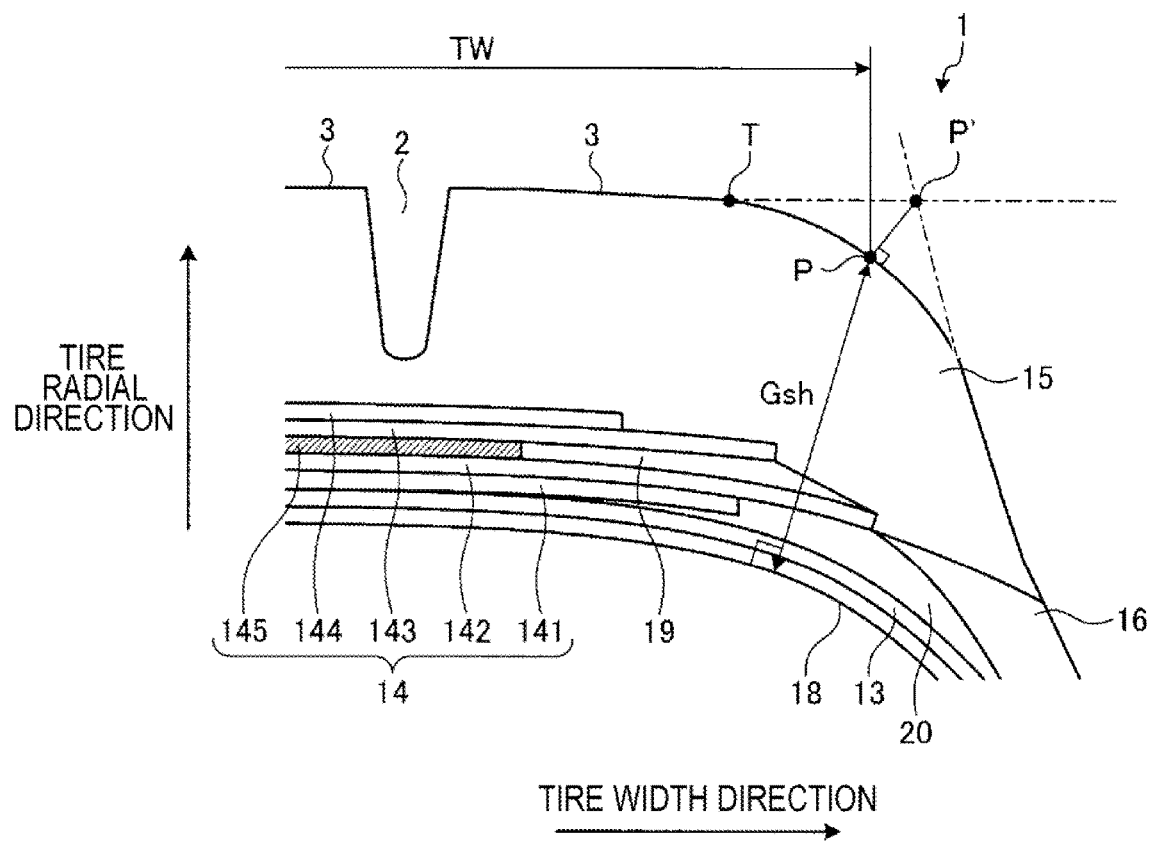
FIG. 5 is an explanatory view illustrating a modified example of the pneumatic tire depicted in FIG. 1.

The upper limit of the Gsh/Gcc ratio is not particularly limited. However, the upper limit of the Gsh/Gcc ratio is preferably specified so that, when the tire is mounted on a specified rim, inflated to the specified internal pressure, and is in an unloaded state, a radius at the tread edge P of the tread profile becomes equal to or less than a radius along the tire equatorial plane CL. Specifically, the upper limit of the Gsh/Gcc ratio is preferably specified so that the tread profile has an arc shape or a linear shape having a center located inward in the tire radial direction and not to have an inverse-R shape (an arc shape having a center located outward in the tire radial direction). For example, in a configuration having a square shaped shoulder portion as in FIG. 2, the upper limit of the ratio Gsh/Gcc is approximately from 1.4 to 1.5. Meanwhile, in a configuration having a round shaped shoulder portion as illustrated in FIG. 5, which will be described below, the upper limit of the ratio Gsh/Gcc is from 1.3 to 1.4, approximately.

The distance Gcc is measured as the distance from the intersection between the tire equatorial plane CL and the tread profile to the intersection between the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an innerliner 18 on the inner circumferential surface of the carcass layer 13, and the innerliner 18 is disposed across the entire region of the tire inner circumferential surface. In such a configuration, the distance Gcc and the distance Gsh are measured with the surface of the innerliner 18 (tire inner circumferential surface) as a point of reference.

The tread edge P refers to a point of the edge portion of the tread in a configuration (1) having a square shaped shoulder portion. For example, in the configuration illustrated in FIG. 2, the tread edge P and a tire ground contact edge T are in accord with each other due to the shoulder portion having a square shape. Conversely, in a configuration (2) having the round shaped shoulder portion, as illustrated in the modified example of FIG. 5 described below, the tread edge P is taken as the bottom of a perpendicular line drawn from the intersection P' to the shoulder portion, where an intersection P' is an intersection point between the tread portion profile and the side wall portion profile when viewed as a cross-section from the tire meridian direction.

Additionally, the "tire ground contact edge T" refers to the maximum width position in a tire axial direction of a contact surface between the tire and a flat plate in a configuration in which the tire is mounted on a specified rim, inflated to the specified internal pressure, placed perpendicularly to the flat plate in a static state, and loaded with a load corresponding to a specified load.

A diameter Ya at the highest position of the carcass layer 13, a diameter Yc at the widest position of the carcass layer 13, and a diameter Yd of the carcass layer 13 at the position of the end portion of the circumferential reinforcing layer 145 have relationships such that 0.80≤Yc/Ya≤0.90 and $0.95 \leq Yd/Ya \leq 1.02$ in FIG. 1. As a result, the shape of the carcass layer 13 is made appropriate.

The diameter Ya at the highest position of the carcass layer 13 is measured as a distance from the tire rotational axis to the intersection of the tire equatorial plane CL and the carcass layer 13 when the tire is mounted on the specified rim, inflated to the specified internal pressure, and is in an unload state.

The diameter Yc at the widest position of the carcass layer 13 is measured as a distance from the tire rotational axis to the widest position of the carcass layer 13 when the tire is mounted on the specified rim, inflated to the specified internal pressure, and is in an unloaded state.

The diameter Yd of the carcass layer 13 at the position of the end portion of the circumferential reinforcing layer 145 is measured as a distance from the tire rotational axis to the intersection of the carcass layer 13 and a straight line drawn in the tire radial direction from the end portion of the circumferential reinforcing layer 145, when the tire is mounted on a specified rim, inflated to the specified internal pressure, and is in an unloaded state.

Furthermore, in FIG. 1, a tire actual ground contact width Wg (not illustrated) and a cross-sectional width Wca of the carcass layer 13 preferably have a relationship such that $0.64 \leq Wg/Wca \leq 0.84$.

The tire actual ground contact width Wg is calculated as a difference between the tire overall ground contact width and the sum of the groove widths of all the circumferential main grooves 2.

Additionally, in FIG. 2, a difference Dr (=R1−R2) between a radius R1 of the circumferential reinforcing layer 145 at the tire equatorial plane CL and a radius R2 of the circumferential reinforcing layer 145 at the end portion on the outer side in the tire width direction, and the width Ws of the circumferential reinforcing layer 145 preferably have a relationship such that $-0.010 \leq Dr/Ws \leq 0.010$. When the sign of the difference Dr is positive, the radius R1 of the circumferential reinforcing layer 145 along the tire equatorial plane CL is larger than the radius R2 at the end portion, and, in a state illustrated in FIG. 2, the circumferential reinforcing layer 145 curves downward to the right. In contrast, when the sign of the difference Dr is negative, in the state illustrated in FIG. 2, the circumferential reinforcing layer 145 curves upward to the right.

The radii R1, R2 of the circumferential reinforcing layer 145 are measured as a distance from a tire rotational axis to a center line of the circumferential reinforcing layer 145, when viewed as a cross-section from the tire meridian direction, when the tire is mounted on a specified rim, inflated to the specified internal pressure, and is in an unloaded state.

Figure 4A:
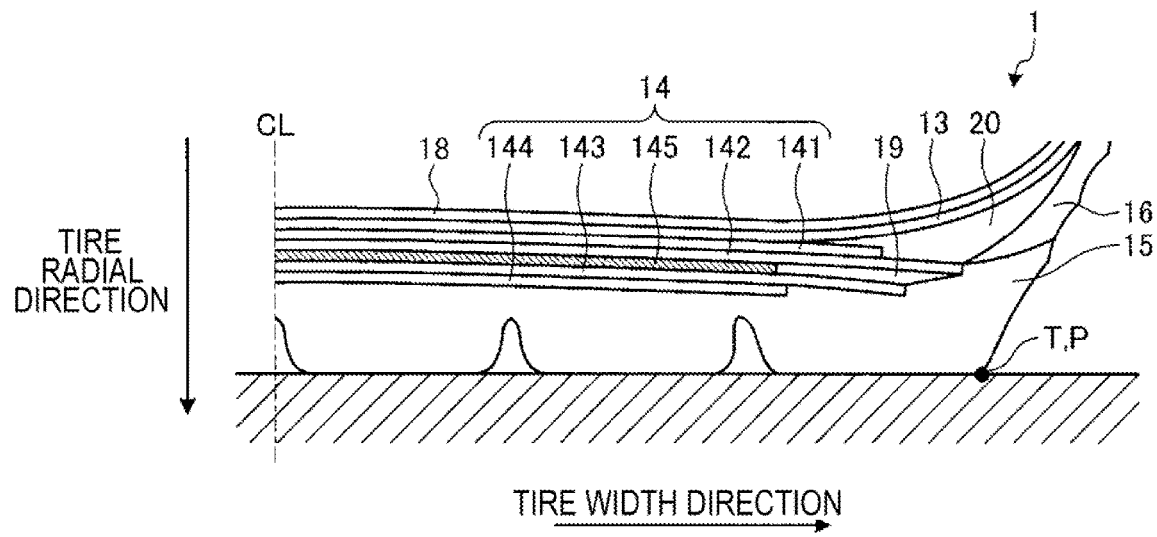
FIGS. 4A and 4B are explanatory views illustrating the effect of the pneumatic tire depicted in FIG. 1.
Figure 4B:
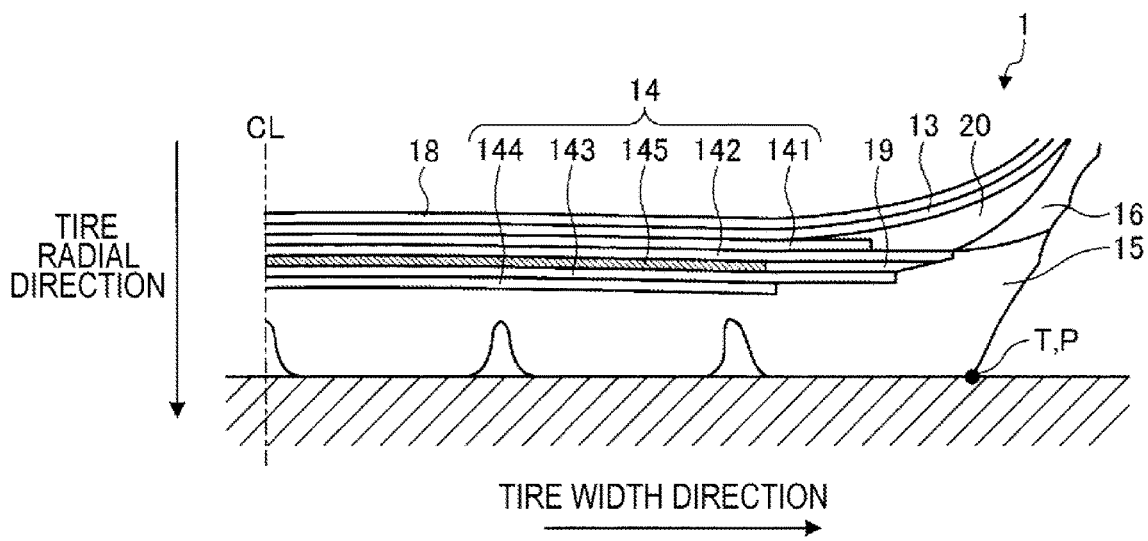

FIGS. 4A and 4B are explanatory views illustrating the effect of the pneumatic tire depicted in FIG. 1. FIGS. 4A and 4B illustrate respective ground contact states of tires having mutually different ratios De/Dcc and Gsh/Gcc.

In a tire of a comparative example of FIG. 4A having the configuration illustrated in FIGS. 1 to 3, the ratio De/Dcc is set with both values being equal (De/Dcc=1.00) and the ratio Gsh/Gcc is set to a small value (Gsh/Gcc=1.06). In such a configuration, when the tire is not in contact with the ground, the tread profile has a shoulder drop shape in which the outside diameter decreases from the tire equatorial plane CL toward the tread edge P (not illustrated). Thus, as illustrated in FIG. 4A, when the tire contacts the ground, the shoulder region in the tread portion deforms greatly toward a road surface side (outward in the tire radial direction). At this time, as the distances Dcc and De from the circumferential reinforcing layer 145 to the wear end surface WE are uniform (De/Dcc=1.00), the end portion of the circumferential reinforcing layer 145 bends greatly toward the road surface side (outward in the tire radial direction) following the deformation of the shoulder region in the tread portion. As a result, strain of the circumferential reinforcing layer 145 becomes large when the tire contacts the ground.

Whereas, in a tire of a working example of FIG. 4B having the configuration illustrated in FIGS. 1 to 3, the ratio De/Dcc is set to a small value (De/Dcc=0.92) and the ratio Gsh/Gcc is set to a large value (Gsh/Gcc=1.20). In such a configuration, when the tire is not in contact with the ground, a difference in diameters between the outer diameter of the tread profile along the tire equatorial plane CL and the outer diameter at the tread end P is small, and the tread profile has a flat shape (substantially parallel to the tire rotational axis) as a whole (see FIG. 1 and FIG. 2). As a result, as illustrated in FIG. 4B, when the tire contacts the ground, the amount of deformation of the shoulder region in the tread portion is small. Furthermore, as the distances Dcc and De from the circumferential reinforcing layer 145 to the wear end surface WE have a relationship such that De≤Dcc, when the tire contacts the ground, the end portion of the circumferential reinforcing layer 145 bends following the deformation of the shoulder region in the tread portion, resulting in the circumferential reinforcing layer 145 taking on a flat shape as a whole. In this manner, the strain of the circumferential reinforcing layer 145 is reduced when the tire contacts the ground.

As described above, in the configuration illustrated in FIG. 4B, compared with the configuration illustrated in FIG. 4A, when the tire contacts the ground, the amount of deformation of the shoulder region in the tread portion is small, and also, the strain of the circumferential reinforcing layer 145 is small. As a result, stiffness of the shoulder region in the tread portion is secured, and also, the separation of the peripheral rubber of the circumferential reinforcing layer 145 is suppressed.

Moreover, in the configuration in FIG. 4B, as a result of the relationships between the diameter Ya at the highest position of the carcass layer 13, the diameter Yc at the widest position of the carcass layer 13, and the diameter Yd of the carcass layer 13 at the position of the end portion of the circumferential reinforcing layer 145 (Yc/Ya and Yd/Ya) being made appropriate, the shape of the carcass layer 13 is made appropriate. In this manner, when the tire contacts the ground, the amount of deformation of the carcass layer 13 in a region where the circumferential reinforcing layer 145 is disposed is reduced, and thereby, the separation of the peripheral rubber of the circumferential reinforcing layer 145 is suppressed more effectively.

Round Shaped Shoulder Portion

FIG. 5 is an explanatory view of a modified example of the pneumatic tire depicted in FIG. 1. FIG. 5 illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited thereto, and may also have a round shape, as illustrated in FIG. 5. In such a case, an intersection P' is taken as an intersection between the tread portion profile and the side wall portion profile when viewed as a cross-section from the tire meridian direction, and the tread edge P is taken as a point at the bottom of a perpendicular line drawn from the intersection P' to the shoulder portion. Therefore, the tire ground contact edge T and the tread edge P normally are in mutually different locations.

Inverse-R Shape of Shoulder Land Portions

Figure 6:
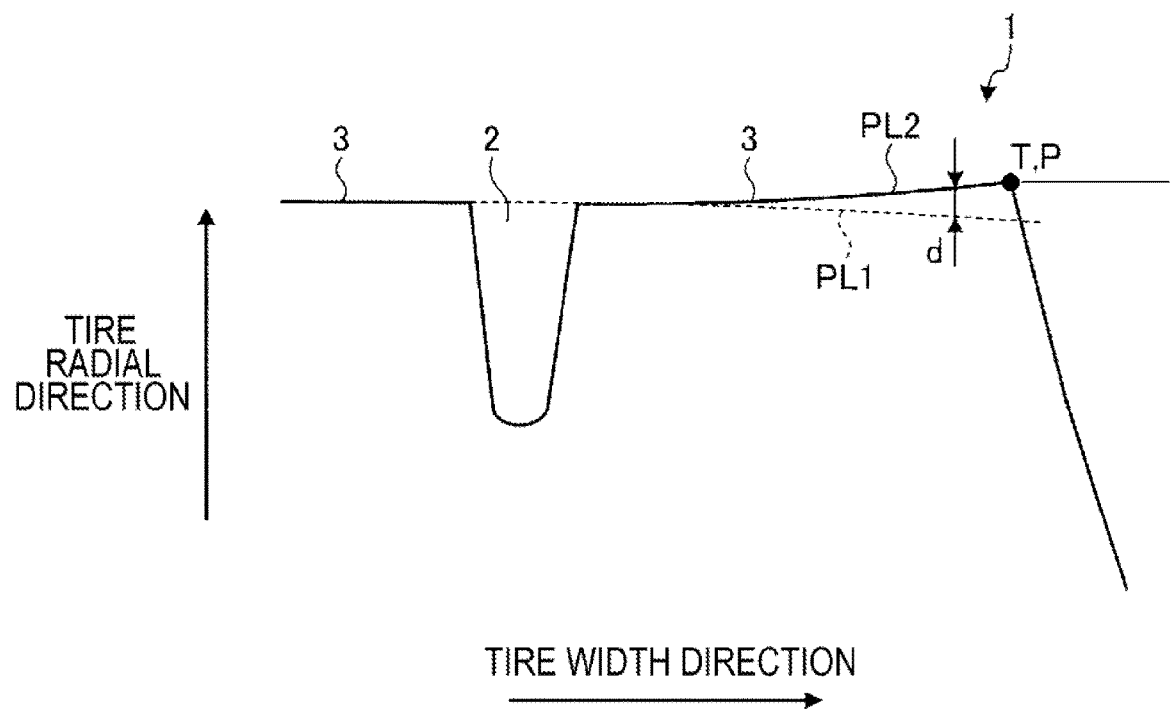
FIG. 6 is an explanatory view illustrating a modified example of the pneumatic tire depicted in FIG. 1.

FIG. 6 is an explanatory view illustrating a modified example of the pneumatic tire depicted in FIG. 1, FIG. 6 illustrates a relationship between a first profile PL1 of the land portions 3 in the center region and a second profile PL2 of the shoulder land portions 3.

In the configuration illustrated in FIG. 1, when viewed as a cross-section from the tire meridian direction in an inflated state, the tread profile from the tire equatorial plane CL to the tire ground contact edge T is a substantially straight line and has a flat ground contact patch form.

In contrast, the configuration illustrated in FIG. 6, when viewed as a cross-section from the tire meridian direction in an inflated state, has the first profile PL1 in which the center land portions 3 and the second land portions 3, which are located inward in the tire width direction from the left and right outermost circumferential main grooves 2, 2, protrude outward in the tire radial direction. Furthermore, the configuration has the second profile PL2 in which the shoulder land portions 3, which are located outward in the tire width direction from the left and right outermost circumferential main grooves, protrude inward in the tire radial direction in a ground contact patch. Furthermore, a distance d in the tire radial direction between an extended line of the first profile PL1 in the ground contact patch of the shoulder land portions 3 and the second profile PL2 increases toward the outer side in the tire width direction.

Furthermore, in the above-described configuration, the first profile PL1 and the second profile PL2 are preferably smooth curved lines formed of a single arc or a combination of a plurality of arcs. However, the present technology is not limited thereto, and the first profile PL1 and the second profile PL2 may be formed by partially including a straight line.

Furthermore, it is preferable that a diameter of the second profile PL2 at the tire ground contact edge T be greater than a diameter of the second profile PL2 at an edge portion of the shoulder land portion 3 inward in the tire width direction. Thus, as illustrated in FIG. 6, the shoulder land portion 3 preferably has a ground contact patch form that gradually rises outward in the tire radial direction toward the outer side in the tire width direction.

However, the present technology is not limited thereto, and the diameter of the second profile PL2 at the tire ground contact edge T may be equal to or less than the diameter of the second profile PL2 at the edge portion of the shoulder land portion 3 inward in the tire width direction. Thus, the shoulder land portion 3 may have a ground contact patch form that is flat or has a shoulder drop downward toward the outer side in the tire width direction.

Note that the shape of the profile and the diameter of the profile are measured when the tire is mounted on a specified rim, inflated to the specified internal pressure, and is in an unloaded state. Furthermore, the diameter of the profile is measured as a diameter of the profile centered on the tire rotational axis.

Diameter of Tread Profile

Furthermore, in this pneumatic tire 1, in FIG. 1, the diameter D1 of the tread profile along the tire equatorial plane CL, the diameter D2 of the tread profile at the edge portion of the shoulder land portion 3 inward in the tire width direction, and the diameter D3 of the tread profile at the end portion of the circumferential reinforcing layer 145 have a relationship such that D1>D2, D1>D3, and $-0.65 \leq (D2-D3)/(D1-D3) \leq 0.85$. Specifically, the ratio (D2−D3)/(D1−D3) between the amount of shoulder drop of the tread profile in the region from the tire equatorial plane CL to the end portion of the circumferential reinforcing layer 145 (D1−D3) and the amount of shoulder drop of the tread profile in the shoulder land portion 3 (D2−D3) is made appropriate within a predetermined range. As a result, deformation of the shoulder portion when the tire contacts the ground is effectively suppressed, and stiffness of the shoulder portion is properly assured.

The tread profile diameters D1 to D3 are radii at respective positions of the tread profile and are measured when the tire is mounted on a specified rim, inflated to the specified internal pressure, and is in an unloaded state.

Also, in the configuration of FIG. 1, the outside diameters D1 to D3 at each location of the tread profile preferably have a relationship such that 7 mm≤D1−D3≤14 mm and −4 mm≤D2−D3≤5 mm. As a result, the shape of the tread profile at the shoulder portion is made appropriate.

Furthermore, in the configuration illustrated in FIG. 1, the large angle belt 141 and the cross belt 142 on the inner side in the tire radial direction of the pair of cross belts 142, 143, are disposed adjacent to each other, as illustrated in FIG. 3. At this time, an intercord distance Dc (not illustrated) between the belt cords of the large angle belt 141 and the belt cords of the cross belt 142 located inward in the tire radial direction is preferably within a range of 0.50 mm≤Dc≤1.50 mm. As a result, the intercord distance Dc between the large angle belt 141 and the cross belt 142 is made appropriate.

The intercord distance of the belt plies can be defined for each of the adjacent belt plies. Also, the intercord distance is the thickness of the rubber material between belt cords.

Moreover, the intercord distance, for example, is measured under the following conditions. For example, when the tire is mounted on a specified rim, inflated to the specified internal pressure, and is in an unloaded state, a single tire is arranged to match the imaginary line of the tire profile measured by a laser profiler and fixed with tape or the like. Next, the distance between the bottom edge position of the wire outward in the tire radial direction and the upper edge position of the wire inward in the tire radial direction of the belt layer to be measured is measured using calipers or the like, and the value is taken to be the intercord distance. The laser profiler used here is a tire profile measuring device (manufactured by Matsuo Co., Ltd.).

Additional Data

Additionally in the pneumatic tire 1, in FIG. 1, the tread width TW and the width Ws of the circumferential reinforcing layer 145 preferably have a relationship such that 0.70≤Ws/TW≤0.90.

The tread width TW is the distance in the direction of the tire rotational axis between the left and right tread edges P, P, measured when the tire is mounted on a specified rim, inflated to the specified internal pressure, and is in an unloaded state.

The width Ws of the circumferential reinforcing layer 145 is the distance from the left to the right end portions of the circumferential reinforcing layer 145 in the direction of the tire rotational axis measured when the tire is mounted on a specified rim, inflated to the specified internal pressure, and is in an unloaded state. Furthermore, when the circumferential reinforcing layer 145 has a structure that is divided in the tire width direction (not illustrated), the width Ws of the circumferential reinforcing layer 145 becomes a distance between outermost end portions of the divided portions.

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer and the tread width TW is defined with widths converted to half width with reference the tire equatorial plane CL. Specifically, the distance TW' (not illustrated) from the tire equatorial plane CL to the tread edge P and the distance Ws' (not illustrated) from the tire equatorial plane CL to the end portion of the circumferential reinforcing layer 145 are set with the relationship such that $0.70 \leq Ws'/TW' \leq 0.90$.

Furthermore, as illustrated in FIG. 1, the tread width TW and a total tire width SW have a relationship such that $0.79 \leq TW/SW \leq 0.89$.

The total tire width SW refers to a linear distance (including all portions such as letters and patterns on the tire side surface) from the side wall to side wall when the tire is mounted on a specified rim, inflated to the specified internal pressure, and is in an unloaded state.

Furthermore, in FIG. 2, a distance Hcc from the circumferential reinforcing layer 145 to the tread profile along the tire equatorial plane CL and a distance He from the end portion of the circumferential reinforcing layer 145 to the tread profile preferably have a relationship such that $He/Hcc \leq 0.97$. The lower limit of the ratio He/Hcc is not particularly limited, but it is subjected to restrictions in relation to groove depth of the tire. For example, the lower limit of the ratio He/Hcc is preferably not less than 0.80.

The distance Hcc and the distance He are measured when the tire is mounted on a specified rim, inflated to the specified internal pressure, and is in an unloaded state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined with reference to the belt cord located furthest out in the tire width direction among the belt cords that constitute the circumferential reinforcing layer 145.

Furthermore, in FIG. 1, a width Wb2 of the wider cross belt 142 and the cross-sectional width Wca of the carcass layer 13 preferably have a relationship such that $0.74 \leq Wb2/Wca \leq 0.89$ and more preferably have a relationship such that $0.78 \leq Wb2/Wca \leq 0.83$.

The width Ws of the circumferential reinforcing layer 145 and the cross-sectional width Wca of the carcass layer 13 preferably have a relationship such that $0.60 \leq Ws/Wca \leq 0.70$.

Furthermore, the tread width TW and the cross-sectional width Wca of the carcass layer 13 preferably have a relationship such that $0.82 \leq TW/Wca \leq 0.92$.

The cross-sectional width Wca of the carcass layer 13 refers to a linear distance between the left and right maximum width positions of the carcass layer 13 when the tire is mounted on a specified rim, inflated to the specified internal pressure, and is in an unloaded state.

Furthermore, in FIG. 3, a width Wb3 of the narrower cross belt 143 and the width Ws of the circumferential reinforcing layer 145 preferably have a relationship such that $0.75 \leq Ws/Wb3 \leq 0.90$. As a result, the width Ws of the circumferential reinforcing layer 145 can be properly secured.

Also, as illustrated in FIG. 3, the circumferential reinforcing layer 145 is preferably disposed inward in the tire width direction from the left and right edge portions of the narrower cross belt 143 of the pair of cross belts 142, 143. Additionally, the width Wb3 of the narrower cross belt 143 and the distance S from the edge portion of the circumferential direction reinforcing layer 145 to the edge portion of the narrower cross belt 143 is preferably in a range of $0.03 \leq S/Wb3 \leq 0.12$. As a result, the distance between the end portions of the width Wb3 of the cross belt 143 and the end portions of the circumferential reinforcing layer 145 are properly secured. This point is the same even if the circumferential reinforcing layer 145 has a divided structure (not illustrated).

The distance S of the circumferential reinforcing layer 145 is measured as a distance in the tire width direction when the tire is mounted on a specified rim, inflated to the specified internal pressure, and is in an unloaded state.

Furthermore, in the configuration in FIG. 1, the circumferential reinforcing layer 145 is constituted by a single steel wire wound in a spiral manner, as illustrated in FIG. 3. However, the configuration is not limited thereto, and the circumferential reinforcing layer 145 may also be constituted by a plurality of wires wound spirally around side-by-side to each other (multiple winding structure). In this case, preferably, the number of wires is 5 or less. Additionally, the width of winding per unit when five wires are wound in the multiple winding manner is preferably not greater than 12 mm. As a result, a plurality of wires (not less than 2 and not more than 5 wires) can be wound properly at an inclination within a range of ±5° with respect to the tire circumferential direction.

Furthermore, in the pneumatic tire 1, the width Wb1 of the large angle belt 141 and the width Wb3 of the narrower cross belt 143 of the pair of cross belts 142, 143 preferably have a relationship such that $0.85 \leq Wb1/Wb3 \leq 1.05$ (see FIG. 3). As a result, the ratio Wb1/Wb3 is made appropriate.

The width Wb1 of the large angle belt 141 and the width Wb3 of the cross belt 143 are measured as the distance in the tire width direction when the tire is mounted on a specified rim, inflated to the specified internal pressure, and is in an unloaded state.

In the configuration of FIG. 1, the belt layer 14 has a structure with left-right symmetry centered on the tire equatorial plane CL as illustrated in FIG. 3, and the width Wb1 of the large angle belt 141 and the width Wb3 of the narrower cross belt 143 have a relationship such that Wb1<Wb3. As a result, an edge portion of the large angle belt 141 is disposed inward in the tire width direction from the edge portion of the narrower cross belt 143 in a region on either side of the tire equatorial plane CL. However, the configuration is not limited thereto, and the width Wb1 of the large angle belt 141 and the width Wb3 of the narrower cross belt 143 may have a relationship such that Wb1≥Wb3 (not illustrated).

Furthermore, the belt cords of the large angle belt 141 are preferably steel wire, and the number of ends in the large angle belt preferably is not less than 15 ends/50 mm and not more than 25 ends/50 mm. Moreover, the belt cords of the pair of cross belts 142, 143 are preferably steel wire, and the number of ends in the pair of cross belts 142, 143 preferably is not less than 18 ends/50 mm and not more than 28 ends/50 mm, and more preferably is not less than 20 ends/50 mm and not more than 25 ends/50 mm. Also, the belt cords of the circumferential reinforcing layer 145 are preferably steel wire, and the number of ends in the circumferential reinforcing layer 145 preferably is not less than 17 ends/50 mm and not more than 30 ends/50 mm. As a result, the strengths of the belt plies 141, 142, 143, 145 are properly secured.

Furthermore, a modulus E1 at 100% elongation of the coating rubber of the large angle belt 141 and a modulus Es at 100% elongation of the coating rubber of the circumferential reinforcing layer 145 preferably have a relationship such that $0.90 \leq Es/E1 \leq 1.10$. Moreover, moduli E2, E3 at 100% elongation of the coating rubbers of the pair of cross belts 142, 143, and the modulus Es at 100% elongation of the coating rubber of the circumferential reinforcing layer 145 preferably have a relationship such that $0.90 \leq Es/E2 \leq 1.10$ and $0.90 \leq Es/E3 \leq 1.10$. Moreover, the modulus Es at 100% elongation of the coating rubber of the circumferential reinforcing layer 145 is preferably within the range of $4.5\ \text{MPa} \leq Es \leq 7.5\ \text{MPa}$. As a result, the moduli of the belt plies 141, 142, 143, 145 are made appropriate.

The modulus at 100% elongation is measured in a tensile test at ambient temperature in conformance with JIS (Japanese Industrial Standard) K6251 (using dumbbell no. 3).

Furthermore, a breaking elongation $\lambda 1$ of the coating rubber of the large angle belt 141 is preferably not less than 200%. Moreover, breaking elongations $\lambda 2$, $\lambda 3$ of the coating rubbers of the pair of cross belts 142, 143 are preferably not less than 200%. Furthermore, a breaking elongation $\lambda s$ of the coating rubber of the circumferential reinforcing layer 145 is preferably not less than 200%. As a result, the durability of the belt plies 141 142, 143, 145 is properly secured.

Breaking elongation is measured by performing a tensile test conforming to JIS-K7161 on a test sample of the JIS-K7162 specification 1B shape (dumbbell shape with a thickness of 3 mm) using a tensile tester (INSTRON 5585H manufactured by Instron Corp.) at a pulling speed of 2 mm/min.

Elongation of the belt cords, as components, which constitute the circumferential reinforcing layer 145 is preferably not less than 1.0% and not greater than 2.5% when the tensile load is from 100 N to 300 N, and elongation of the belt cords, as a cured tire component (when removed from the tire), is preferably not less than 0.5% and not greater than 2.0% when the tensile load is from 500 N to 1000 N. Such belt cords (high elongation steel wire) have a good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is preferable.

The elongation of the belt cord is measured in accordance with JIS G3510.

Additionally, in the pneumatic tire 1, the breaking elongation of the tread rubber 15 is preferably not less than 350%. As a result, the strength of the tread rubber 15 is assured and the occurrence of tears in the outermost circumferential main groove 2 is suppressed. Furthermore, the maximum breaking elongation of the tread rubber 15 is not specifically limited, but is constrained by the type of rubber compound of the tread rubber 15.

Additionally, in this pneumatic tire 1, the hardness of the tread rubber 15 preferably is not less than 60. This ensures an appropriate strength of the tread rubber 15. Furthermore, the maximum hardness of the tread rubber 15 is not specifically limited, but is constrained by the type of rubber compound of the tread rubber 15.

Here, "rubber hardness" refers to JIS-A hardness in accordance with JIS-K6263.

Furthermore, in the pneumatic tire 1, a loss tangent tan $\delta$ of the tread rubber 15 is preferably not less than 0.10.

The loss tangent tan $\delta$ is measured by using a viscoelastic spectrometer under the conditions of a temperature of 20° C., a shearing strain of 10%, and a frequency of 20 Hz.

Belt Cushion

As illustrated in FIG. 2, the pneumatic tire 1 is provided with a belt cushion 20. The belt cushion 20 is disposed interposed between the carcass layer 13 and the end portion of the cross belt 142 on the inner side in the tire radial direction of the pair of cross belts 142, 143. For example, in the configuration in FIG. 2, the belt cushion 20 has an end portion on the outer side in the tire radial direction inserted between the carcass layer 13 and the end portion of the cross belt 142, and abuts the edge portion of the large angle belt 141. Additionally, the belt cushion 20 extends inward in the tire radial direction along the carcass layer 13 and is disposed interposed between the carcass layer 13 and a side wall rubber 16. Moreover, a pair of left and right belt cushions 20 are disposed at the left and right side wall portions of the tire.

Additionally, a modulus Ebc at 100% elongation of the belt cushion 20 is within a range of $1.5\ \text{MPa} \leq Ebc \leq 3.0\ \text{MPa}$. Having the modulus Ebc in such a range, the belt cushion 20 exhibits the stress relief action, thereby suppressing separation of the peripheral rubber at the end portions of the cross belt 142.

Moreover, a breaking elongation $\lambda bc$ of the belt cushion 20 is not less than 400%. This ensures an appropriate durability of the belt cushion 20.

Belt Edge Cushion Two-Color Structure

Figure 7:
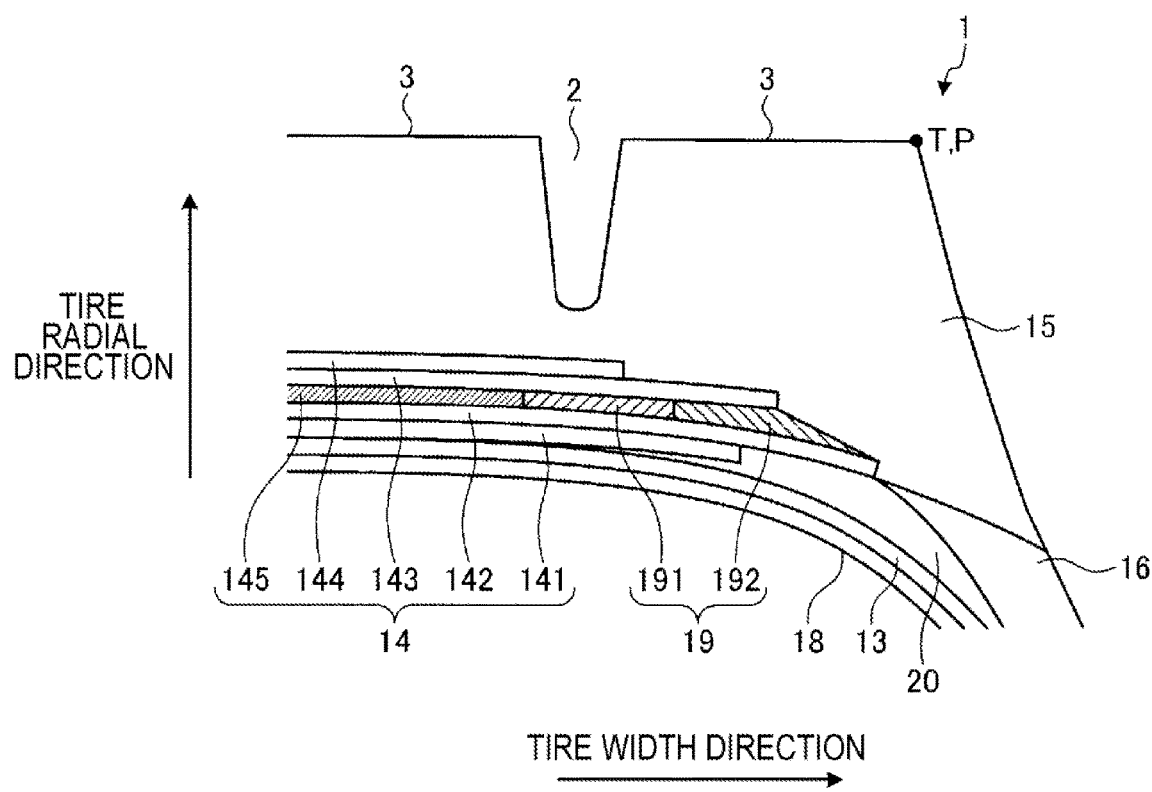
FIG. 7 is an explanatory view illustrating a modified example of the pneumatic tire depicted in FIG. 1.

FIG. 7 is an explanatory view of a modified example of the pneumatic tire depicted in FIG. 1. FIG. 7 is an enlarged view of an end portion on the outer side of the belt layer 14 in the tire width direction. The circumferential reinforcing layer 145 and the belt edge cushion 19 in FIG. 7 are indicated by hatching.

In the configuration illustrated in FIG. 1, the circumferential reinforcing layer 145 is disposed inward in the tire width direction from the left and right edge portions of the narrower cross belt 143 of the pair of cross belts 142, 143. The belt edge cushion 19 is disposed interposed between the pair of cross belts 142, 143 at a position corresponding to the edge portion of the pair of cross belts 142, 143. Specifically, the belt edge cushion 19 is disposed outward of the circumferential reinforcing layer 145 in the tire width direction, is adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that $0.60 \leq E/Eco \leq 0.95$. As a result, the occurrence of separation of rubber material between the pair of cross belts 142, 143 and in a region outward of the circumferential reinforcing layer 145 in the tire width direction is suppressed.

Conversely, according to the configuration illustrated in FIG. 7, the belt edge cushion 19 in the configuration illustrated in FIG. 1 has a two-color structure constituted by a stress relief rubber 191 and an edge portion relief rubber 192. The stress relief rubber 191 is disposed between the pair of cross belts 142, 143 outward of the circumferential reinforcing layer 145 in the tire width direction, and is adjacent to the circumferential reinforcing layer 145. The edge portion relief rubber 192 is disposed between the pair of cross belts 142, 143 outward of the stress relief rubber 191 in the tire width direction at a position corresponding to the edge portion of the pair of cross belts 142, 143, and is adjacent to the stress relief rubber 191. Therefore, when viewed as a cross-section from the tire meridian direction, the belt edge cushion 19 has a structure formed by the stress relief rubber 191 and the edge portion relief rubber 192 disposed side to side in the tire width direction and is disposed in the gap of the region from the end portion on the outer side of the circumferential reinforcing layer 145 in the tire width direction to the edge portion of the pair of cross belts 142, 143.

Additionally, in the configuration of FIG. 7, a modulus Ein at 100% elongation of the stress relief rubber 191 and the modulus Es at 100% elongation of the coating rubber of the circumferential reinforcing layer 145 have a relationship such that Ein<Es. Specifically, the modulus Ein of the stress relief rubber 191 and the modulus Es of the circumferential reinforcing layer 145 preferably have a relationship such that $0.6 \leq Ein/Es \leq 0.9$.

Moreover, in the configuration illustrated in FIG. 7, a modulus Ein at 100% elongation of the stress relief rubber 191 and the modulus Eco at 100% elongation of the coating rubber of the cross belts 142, 143 have a relationship such that Ein<Eco. Specifically, the modulus Ein of the stress relief rubber 191 and the modulus Eco of the coating rubber preferably have a relationship such that $0.6 \leq Ein/Eco \leq 0.9$.

Additionally, in the configuration of FIG. 7, a modulus Eout at 100% elongation of the end portion relief rubber 192 and the modulus Ein at 100% elongation of the stress relief rubber 191 preferably have a relationship such that Eout<Ein. Additionally, the modulus Ein at 100% elongation of the stress relief rubber 191 preferably is within a range of $4.0 \text{ MPa} \leq Ein \leq 5.5 \text{ MPa}$.

Since the stress relief rubber 191 is disposed outward of the circumferential reinforcing layer 145 in the tire width direction in the configuration illustrated in FIG. 7, shearing strain of the peripheral rubbers at the edge portion of the circumferential reinforcing layer 145 and between the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

Effect

As described above, the pneumatic tire 1 includes the carcass layer 13, the belt layer 14 disposed outward of the carcass layer 13 in the tire radial direction, and the tread rubber 15 disposed outward of the belt layer 14 in the tire radial direction (see FIG. 1). Furthermore, the pneumatic tire 1 is provided with at least three of the circumferential main grooves 2 extending in the tire circumferential direction and the plurality of land portions 3 that are defined by the circumferential main grooves 2. Furthermore, the belt layer 14 is formed by laminating the pair of cross belts 142, 143 having belt angles, as an absolute value, of not less than 10° and not greater than 45° and of mutually opposite signs, and the circumferential reinforcing layer 145 having a belt angle within a range of ±5° with respect to the tire circumferential direction (see FIG. 2). Furthermore, when viewed as a cross-section from the tire meridian direction, when the wear end surface WE of the circumferential main groove 2 is drawn, the distance Dcc from the circumferential reinforcing layer 145 to the wear end surface WE along the tire equatorial plane CL and the distance De from the end portion of the circumferential reinforcing layer 145 to the wear end surface WE have a relationship such that $De/Dcc \leq 0.94$. Furthermore, the diameter Ya at the highest position on the carcass layer 13 and the diameter Yd of the carcass layer 13 at the position of the end portion of the circumferential reinforcing layer 145 have a relationship such that $0.95 \leq Yd/Ya \leq 1.02$ (see FIG. 1).

In such a configuration, as the distances Dcc and De of the circumferential reinforcing layer 145 with respect to the wear end surface WE are made appropriate, strain of the circumferential reinforcing layer 145 is reduced when the tire contacts the ground (refer to FIGS. 4A and 4B for comparison). Furthermore, as the diameter Yd of the carcass layer 13 at the position of the end portion of the circumferential reinforcing layer 145 is made appropriate, the amount of deformation of the carcass layer 13 in the region where the circumferential reinforcing layer 145 is disposed is reduced when the tire contacts the ground. Specifically, as a result of having the relationship of $0.95 \leq Yd/Ya$, the amount of deformation of the carcass layer 13 in the region where the circumferential reinforcing layer 145 is disposed is reduced when the tire contacts the ground. Furthermore, as a result of having the relationship of $Yd/Ya \leq 1.02$, the tire shape is properly secured. As a result, there is an advantage that the separation of the peripheral rubber of the circumferential reinforcing layer 145 is suppressed.

Furthermore, in the pneumatic tire 1, the diameter Ya at the highest position of the carcass layer 13 and the diameter Yc at the widest position of the carcass layer 13 have a relationship such that $0.80 \leq Yc/Ya \leq 0.90$ (see FIG. 1). As a result, there is an advantage that the shape of the carcass layer 13 is made appropriate, and when the tire contacts the ground, the amount of deformation of the carcass layer 13 in the region where the circumferential reinforcing layer 145 is disposed is effectively reduced.

Furthermore, in the pneumatic tire 1, the distance Gcc from the tread profile to the tire inner circumferential surface along the tire equatorial plane CL and the distance Gsh from the tread edge P to the tire inner circumferential surface have a relationship such that $1.10 \leq Gsh/Gcc$ (see FIG. 2). In such a configuration, as the tread profile has a flat shape as a whole when the tire is not in contact with the ground (see FIG. 1 and FIG. 2), the amount of deformation of the shoulder region in the tread portion is reduced when the tire contacts the ground (refer to FIGS. 4A and 4B for comparison). As a result, there is an advantage that the separation of the peripheral rubber of the circumferential reinforcing layer 145 is suppressed more effectively. Furthermore, there is an advantage that repeated strain at the end portion of the circumferential reinforcing layer 145 when the tire is rolling is reduced and failure of the belt cords of the circumferential reinforcing layer 145 is suppressed.

Furthermore, in this pneumatic tire 1, the diameter D1 of the tread profile along the tire equatorial plane CL, the diameter D2 of the tread profile at the edge portion of the shoulder land portion 3 inward in the tire width direction, and the diameter D3 of the tread profile at the end portion of the circumferential reinforcing layer 145 have a relationship such that D1>D2, D1>D3, and $-0.65 \leq (D2-D3)/(D1-D3) \leq 0.85$ (see FIG. 1). In such a configuration, as the relationships among the outside diameters D1 to D3 at respective positions of the tread profile are made appropriate, the amount of deformation of the shoulder portion is made even smaller when the tire contacts the ground. As a result, there is an advantage that the occurrence of tears in the shoulder land portion 3 is effectively suppressed.

Moreover, in the pneumatic tire 1, a width Ws of the circumferential reinforcing layer 145 and a width Wca of the carcass layer 13 have a relationship such that $0.60 \leq Ws/Wca \leq 0.70$ (see FIG. 1). As a result, there is an advantage that the ratio Ws/Wca between the width Ws of the circumferential reinforcing layer 145 and the width Wca of the carcass layer 13 is made appropriate. Specifically, as a result of having the relationship of $0.60 \leq Ws/Wca$, the function of the circumferential reinforcing layer 145 is properly secured. Furthermore, as a result of having the relationship of $Ws/Wca \leq 0.70$, fatigue failure of the belt cords at the edge portion of the circumferential reinforcing layer 145 is suppressed.

Additionally, in the pneumatic tire 1, the tread width TW and a cross-sectional width Wca of the carcass layer 13 have a relationship such that $0.82 \leq TW/Wca \leq 0.92$ (see FIG. 1). There is an advantage that the ratio TW/Wca between the tread width TW and the cross-sectional width Wca of the carcass layer 13 is made appropriate. Specifically, as a result of having the relationship of $0.82 \leq TW/Wca$, a difference in radial growth between the center region and the shoulder region is alleviated, and the ground contact pressure distribution in the tire width direction is made uniform. As a result, a load on the belt layer 14 is distributed, and durability of the tire is improved. Moreover, as a result of having the relationship of $TW/Wca \leq 0.92$, rising of the shoulder portion is suppressed, bending when the tire makes ground contact is suppressed, and a load on the belt layer 14 is effectively distributed.

Furthermore, in the pneumatic tire 1, the tread width TW and the total tire width SW have a relationship such that $0.79 \leq TW/SW \leq 0.89$ (see FIG. 1). In such a configuration, radial growth in the center region is suppressed due to the belt layer 14 having the circumferential reinforcing layer 145. Furthermore, a difference in radial growths between the center region and the shoulder region is alleviated due to the ratio TW/SW being within the above range. This has the advantage of making the ground contact pressure of the tire uniform. Specifically, as a result of having the relationship of $0.79 \leq TW/SW$, the air volume inside the tire is secured and bending is suppressed. Moreover, as a result of having the relationship of $TW/SW \leq 0.89$, rising of the shoulder portion is suppressed and bending when the tire makes ground contact is suppressed.

Furthermore, in the pneumatic tire 1, the distance Hcc from the circumferential reinforcing layer 145 to the tread profile along the tire equatorial plane CL and the distance He from the end portion of the circumferential reinforcing layer 145 to the tread profile have a relationship such that $He/Hcc \leq 0.97$ (see FIG. 2). In such a configuration, as a positional relationship (the ratio He/Hcc) between the circumferential reinforcing layer 145 and the tread profile is made appropriate, strain of the circumferential reinforcing layer 145 is reduced when the tire contacts the ground. As a result, there is an advantage that the separation of the peripheral rubber of the circumferential reinforcing layer 145 is suppressed.

Furthermore, in the pneumatic tire 1, the difference Dr (=R1−R2) between the radius R1 of the circumferential reinforcing layer 145 along the tire equatorial plane CL and the radius R2 of the end portion on the outer side of the circumferential reinforcing layer 145 in the tire width direction, and the width Ws of the circumferential reinforcing layer 145 have a relationship such that $-0.010 \leq Dr/Ws \leq 0.010$ (see FIG. 1 and FIG. 2). In such a configuration, the ratio Dr/Ws between the amount of shoulder drop (the difference Dr) of the circumferential reinforcing layer 145 and the width Ws is made appropriate. Specifically, due to the ratio Dr/Ws being set within the above-described range, there is no curving of the circumferential reinforcing layer 145 and it is disposed in a flat manner in the tire width direction. In this manner, the strain of the end portion of the circumferential reinforcing layer 145 is reduced when the tire contacts the ground. As a result, there is an advantage that the belt-edge-separation resistance performance of the tire is improved.

Furthermore, in the pneumatic tire 1, the belt layer 14 includes the large angle belt 141 having a belt angle, as an absolute value, of not less than 45° and not greater than 70° (see FIGS. 1 and 3). As a result, there is an advantage that the belt layer 14 is reinforced and the strain of the end portions of the belt layer 14 when the tire contacts the ground is suppressed.

Furthermore, the belt cords of the large angle belt 141 are steel wire, and the number of ends in the large angle belt 141 is not less than 15 ends/50 mm and not more than 25 ends/50 mm (see FIG. 1 and FIG. 3). As a result, there is an advantage that the number of ends in the belt cords of the large angle belt 141 is made appropriate. Specifically, as a result of the number of ends in the large angle belt 141 being not less than 15 ends/50 mm, the strength of the large angle belt 141 is properly secured. Furthermore, as a result of the number of ends in the large angle belt 141 being not more than 25 ends/50 mm, the amount of rubber of the coating rubber of the large angle belt 141 is properly secured, and separation of the rubber materials between the adjacent belt plies (between the carcass layer 13, the cross belt 142 located inward in the tire radial direction, and the large angle belt 141, in FIG. 3) is suppressed.

Furthermore, in the pneumatic tire 1, the width Wb1 of the large angle belt 141 and the width Wb3 of the narrower cross belt 143 of the pair of cross belts 142, 143 have a relationship such that $0.85 \leq Wb1/Wb3 \leq 1.05$ (see FIG. 3). With such a configuration, the ratio Wb1/Wb3 between the width Wb1 of the large angle belt 141 and the width Wb3 of the narrower cross belt 143 is made appropriate. As a result, there is an advantage that the strain of the end portions of the belt layer 14 when the tire contacts the ground is suppressed.

Moreover, in the pneumatic tire 1, the modulus Es at 100% elongation of the coating rubber of the circumferential reinforcing layer 145 is within a range of $4.5 \text{ MPa} \leq Es \leq 7.5$ MPa. As a result, there is an advantage that the modulus of the coating rubber of the circumferential reinforcing layer 145 is made appropriate.

Furthermore, in the pneumatic tire 1, the breaking elongation λs of the coating rubber of the circumferential reinforcing layer 145 is not less than 200%. As a result, there is an advantage that durability of the circumferential reinforcing layer 145 is properly secured.

Furthermore, in the pneumatic tire 1, the breaking elongation λ1 of the coating rubber of the large angle belt 141 is not less than 200%. As a result, there is an advantage that durability of the large angle belt 141 is properly secured.

Additionally, the pneumatic tire 1 includes the belt cushion 20 disposed interposed between the carcass layer 13 and the end portion of the cross belt 142 on the inner side in the tire radial direction of the pair of cross belts 142, 143 (see FIG. 1 and FIG. 2). Additionally, a modulus Ebc at 100% elongation of the belt cushion 20 is within a range of $1.5 \text{ MPa} \leq Ebc \leq 3.0$ MPa. In such a configuration, the belt cushion 20 is disposed between the carcass layer 13 and the cross belt 142 located inward in the tire radial direction, and the modulus Ebc of the belt cushion 20 is made appropriate. This has the advantage of making the belt cushion 20 exhibit the stress relief action to suppress separation of the peripheral rubber at the end portions of the cross belt 142. Specifically, the relationship of 1.5 MPa≤Ebc ensures appropriate durability for the belt cushion 20, and the relationship of Ebc≤3.0 MPa ensures appropriate stress relief action for the belt cushion 20.

Additionally, in the pneumatic tire 1, the breaking elongation λbc of the belt cushion 20 is not less than 400%. This has the advantage of ensuring appropriate durability for the belt cushion 20.

Furthermore, in the pneumatic tire 1, the large angle belt 141 and the cross belt 142 on the inner side in the tire radial direction of the pair of cross belts 142, 143, are disposed adjacent to each other (see FIG. 3). Furthermore, the intercord distance Dc between the belt cords of the large angle belt 141 and the belt cords of the cross belt 142 is within a range of 0.50 mm≤Dc≤1.50 mm. As a result, there is an advantage that the intercord distance Dc between the large angle belt 141 and the cross belt 142 is made appropriate. Specifically, as a result of having the relationship of 0.50 mm≤Dc, the thickness of the rubber material between the adjacent belt cords is secured and the stress relief action between the large angle belt 141 and the cross belt 142 is properly secured. Furthermore, as a result of having the relationship of Dc≤1.50 mm, a hoop effect between the large angle belt and the cross belt can be secured.

Furthermore, when viewed as a cross-section from the tire meridian direction, the land portions 3 which are located inward in the tire width direction from the left and right outermost circumferential main grooves 2, 2, have the first profile PL1 that protrudes outward in the tire radial direction (see FIG. 6). Furthermore, the shoulder land portions 3 which are located outward in the tire width direction from the left and right outermost circumferential main grooves, have the second profile PL2 that protrudes inward in the tire radial direction in the ground contact patch. Furthermore, the distance d in the tire radial direction between the extended line of the first profile PL1 in the ground contact patch of the shoulder land portions 3 and the second profile PL2 increases toward the outer side in the tire width direction. In such a configuration, as the ground contact pressure on the ground contact edge T side of the shoulder land portion 3 increases when the tire contacts the ground, a slippage amount of the land portions in the center region and a slippage amount of the shoulder land portions 3 are made uniform when the tire contacts the ground. As a result, there is an advantage that uneven wear of the shoulder land portions 3 is reduced, and the uneven-wear resistance of the tire is improved.

Also, in the pneumatic tire 1, the belt cords of the circumferential reinforcing layer 145 are steel wire, and the number of ends in the circumferential reinforcing layer 145 is not less than 17 ends/50 mm and not more than 30 ends/50 mm. As a result, there is an advantage that the number of ends of the belt cords in the circumferential reinforcing layer 145 is made appropriate. More specifically, as a result of the number of ends being not less than 17 ends/50 mm, the strength of the circumferential reinforcing layer 145 is properly secured. Furthermore, as a result of the number of ends being not more than 30 ends/50 mm, the amount of rubber of the coating rubber of the circumferential reinforcing layer 145 is properly secured, and the separation of the rubber material between the adjacent belt plies (between the pair of cross belts 142, 143 and the circumferential reinforcing layer 145, in FIG. 3) is suppressed.

In the pneumatic tire 1, the elongation of the belt cords, as components, which constitute the circumferential reinforcing layer 145 is preferably not less than 1.0% and not greater than 2.5% when the tensile load is from 100 N to 300 N. As a result, there is an advantage that the effect of suppressing radial growth in the center region is properly secured due to the circumferential reinforcing layer 145.

In the pneumatic tire 1, elongation of the belt cords, as a cured tire component, which constitutes the circumferential reinforcing layer 145 is not less than 0.5% and not greater than 2.0% when the tensile load is from 500 N to 1000 N. As a result, there is an advantage that the effect of suppressing radial growth in the center region is properly secured due to the circumferential reinforcing layer 145.

In the pneumatic tire 1, the circumferential reinforcing layer 145 is disposed inward in the tire width direction from the left and right edge portions of the narrower cross belt 143 of the pair of cross belts 142, 143 (see FIG. 3). The pneumatic tire 1 includes the stress relief rubber 191 disposed between the pair of cross belts 142, 143 outward of the circumferential reinforcing layer 145 in the tire width direction, and adjacent to the circumferential reinforcing layer 145 and the end portion relief rubber 192 disposed between the pair of cross belts 142, 143 outward of the stress relief rubber 191 in the tire width direction at a position corresponding to the edge portion of the pair of cross belts 142, 143, and adjacent to the stress relief rubber 191 (see FIG. 7). In such a configuration, there is an advantage that fatigue failure of the peripheral rubber at the edge portion of the circumferential reinforcing layer 145 is suppressed due to the circumferential reinforcing layer 145 being disposed inward in the tire width direction from the left and right edge portions of the narrower cross belt 143 of the pair of cross belts 142, 143. Since the stress relief rubber 191 is disposed outward of the circumferential reinforcing layer 145 in the tire width direction, shearing strain of the peripheral rubber at the edge portion of the circumferential reinforcing layer 145 and between the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the peripheral rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that Ein<Eco. As a result, there is an advantage that the modulus Ein of the stress relief rubber 191 is made appropriate and the shearing strain of the peripheral rubber at the edge portion of the circumferential reinforcing layer 145 and between the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that 0.6≤Ein/Eco≤0.9. As a result, there is an advantage that the ratio Ein/Eco is made appropriate and the shearing strain of the peripheral rubber at the edge portion of the circumferential reinforcing layer 145 and between the cross belts 142, 143 is alleviated.

Additionally, in the pneumatic tire 1, the modulus Ein at 100% elongation of the stress relief rubber 191 is within a range of 4.0 MPa≤Ein≤5.5 MPa (see FIG. 7). As a result, there is an advantage that the modulus Ein of the stress relief rubber 191 is made appropriate and the shearing strain of the peripheral rubber at the edge portion of the circumferential reinforcing layer 145 and between the cross belts 142, 143 is alleviated.

In the pneumatic tire 1, the circumferential reinforcing layer 145 is disposed inward in the tire width direction from the left and right edge portions of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 are in a range of 0.03≤S/Wb3≤0.12. This has the advantage of providing an appropriate positional relationship S/Wb3 between the edge portions of the cross belts 142, 143 and the edge portions of the circumferential reinforcing layer 145. Specifically, having the relationship of 0.03≤S/Wb3 ensures an appropriate distance between the end portions of the circumferential reinforcing layer 145 and the end portions of the cross belt 143 to suppress the separation of the peripheral rubbers at the end portions of these belt plies 145, 143. Additionally, having the relationship of S/Wb3≤0.12 ensures the width Ws of the circumferential reinforcing layer 145 relative to the width Wb3 of the cross belt 143 to ensure an appropriate hoop effect from the circumferential reinforcing layer 145.

Target of Application

The pneumatic tire 1 is preferably applied to a heavy duty tire with an aspect ratio of not less than 40% and not greater than 70% when mounted on a regular rim, inflated to the regular internal pressure, and a regular load is applied. A heavy duty tire has a greater load under use than a passenger car tire. As a result, the difference in the diameters between the region where the circumferential reinforcing layer 145 is disposed in the tread surface and the region outward of the circumferential reinforcing layer 145 in the tire width direction may easily increase. Moreover, a footprint having an hourglass shape occurs easily in the tire having a low aspect ratio such as that mentioned above. Thus, by applying the pneumatic tire 1 to such a heavy duty tire, a noticeable effect in improving the above-mentioned belt-edge-separation resistance performance of the tire is achieved.

EXAMPLES

FIGS. 8A to 11B are tables showing results of performance testing of pneumatic tires according to embodiments of the present technology.

In the performance testing, a plurality of mutually different pneumatic tires were evaluated for belt-edge-separation resistance performance (see FIGS. 8A to 11B). In this evaluation, pneumatic tires having a tire size of 315/60 R22.5 were mounted on a rim having a rim size of 22.5×9.00 and inflated with 900 kPa of air pressure. Low pressure endurance testing was conducted using an indoor drum testing machine. Then, a running speed was set to 45 km/h, the load was increased from a load of 34.81 kN by 5% (1.74 kN) every 12 hours, and a running distance when the tire failed was measured. Then, based on the measurement results, index evaluation was performed taking a Conventional Example as a reference (100). With this evaluation, larger numerical values are preferable. Specifically, an evaluation of 110 or greater (+10 points or greater over the standard value of 100) indicates sufficient superiority over the conventional example, and an evaluation of 115 or greater indicates dramatic superiority over the conventional example.

The pneumatic tires 1 of Working Example 1 had the configuration illustrated in FIGS. 1 to 3. Furthermore, the belt angles of the cross belts 142, 143 were ±19°, and the belt angle of the circumferential reinforcing layer 145 was substantially 0°. Additionally, principal dimensions were set at TW=275 mm, Gcc=32.8 mm, Dcc=11.2 mm, Hcc=21.3 mm, Wca=320 mm, D1=950 mm, and D1>D2, D1>D3. The pneumatic tires 1 of Working Examples 2 to 60 are modified examples of the pneumatic tire of Working Example 1.

In the configuration of FIGS. 1 to 3, the pneumatic tire of the Conventional Example does not have a circumferential reinforcing layer 145.

As can be seen from the test results, the pneumatic tires 1 of the Working Examples 1 to 60 demonstrate improved belt-edge-separation resistance performance of the tire. Furthermore, when comparing Working Examples 1 to 14 in particular, it can be seen that a superior effect (an evaluation of 110 or higher) of the belt-edge-separation resistance performance is achieved as a result of having the relationships of 1.20≤Gsh/Gcc, De/Dcc≤0.92, 0.80≤Yc/Ya≤0.90, and 0.95≤Yd/Ya≤1.02.

What is claimed is:

1. A pneumatic tire comprising:
   a carcass layer;
   a belt layer disposed outward of the carcass layer in a tire radial direction;
   a tread rubber disposed outward of the belt layer in the tire radial direction; at least three circumferential main grooves extending in a tire circumferential direction; and
   a plurality of land portions partitioned by the circumferential main grooves,
   the belt layer being formed by laminating a pair of cross belts having belt angles, as an absolute value, of not less than 10° and not greater than 45° and of mutually opposite signs, and a circumferential reinforcing layer having a belt angle within a range of ±5° with respect to the tire circumferential direction,
   when viewed as a cross-section from a tire meridian direction, when a wear end surface WE of the circumferential main grooves is drawn, a distance Dcc from the circumferential reinforcing layer to the wear end surface WE along a tire equatorial plane and a distance De from an end portion of the circumferential reinforcing layer to the wear end surface WE having a relationship such that De/Dcc≤0.94,
   a diameter Ya at a highest position of the carcass layer and a diameter Yd of the carcass layer at a position of the end portion of the circumferential reinforcing layer having a relationship such that 0.95≤Yd/Ya≤1.02,
   a distance Gcc from a tread profile to a tire inner circumferential surface along the tire equatorial plane and a distance Gsh from a tread edge to the tire inner circumferential surface having a relationship such that 1.20≤Gsh/Gcc,
   the land portion located furthest out in a tire width direction being referred to as a shoulder land portion, a diameter D1 of the a tread profile along the tire equatorial plane, a diameter D2 of the tread profile at an edge portion of the shoulder land portion inward in the tire width direction, and a diameter D3 of the tread profile at an end portion of the circumferential reinforcing layer having a relationship such that D1>D2, D1>D3, and 0≤(D2−D3)/(D1−D3)≤0.85, and the circumferential reinforcing layer terminating inward in the tire width direction of an outermost circumferential main groove in the tire width direction.

2. The pneumatic tire according to claim 1, wherein the diameter Ya at the highest position of the carcass layer and a diameter Yc at a widest position of the carcass layer have a relationship such that 0.80≤Yc/Ya≤0.90.

3. The pneumatic tire according to claim 1, wherein, when the land portion located furthest out in a tire width direction is referred to as a shoulder land portion, a diameter D1 of a tread profile along the tire equatorial plane, a diameter D2 of the tread profile at an edge portion of the shoulder land portion inward in the tire width direction, and a diameter D3 of the tread profile at an end portion of the circumferential reinforcing layer have a relationship such that D1>D2, D1>D3, and −0.65≤(D2−D3)/(D1−D3)≤0.85.

4. The pneumatic tire according to claim 1, wherein a width Ws of the circumferential reinforcing layer and a width Wca of the carcass layer have a relationship such that 0.60≤Ws/Wca≤0.70.

5. The pneumatic tire according to claim 1, wherein a tread width TW and a cross-sectional width Wca of the carcass layer have a relationship such that 0.82≤TW/Wca≤0.92.

6. The pneumatic tire according to claim 1, wherein a tread width TW and a total tire width SW have a relationship such that 0.79≤TW/SW≤0.89.

7. The pneumatic tire according to claim 1, wherein a distance Hcc from the circumferential reinforcing layer to a tread profile along the tire equatorial plane and a distance He from the end portion of the circumferential reinforcing layer to the tread profile have a relationship such that He/Hcc≤0.97.

8. The pneumatic tire according to claim 1, wherein a difference Dr between a diameter of the circumferential reinforcing layer along the tire equatorial plane and a diameter at the end portion on an outer side of the circumferential reinforcing layer in a tire width direction, and a width Ws of the circumferential reinforcing layer have a relationship such that 0.010≤Dr/Ws≤0.010.

9. The pneumatic tire according to claim 1, wherein the belt layer comprises a large angle belt having a belt angle, as an absolute value, of not less than 45° and not greater than 70°.

10. The pneumatic tire according to claim 9, wherein belt cords of the large angle belt are steel wire, and a number of ends in the large angle belt is not less than 15 ends/50 mm and not more than 25 ends/50 mm.

11. The pneumatic tire according to claim 9, wherein a width Wb1 of the large angle belt and a width Wb3 of a narrower cross belt of the pair of cross belts have a relationship such that 0.85≤Wb1/Wb3≤1.05.

12. The pneumatic tire according to claim 9, wherein a breaking elongation λ1 of a coating rubber of the large angle belt is not less than 200%.

13. The pneumatic tire according to claim 9, wherein the large angle belt and the cross belt on an inner side in the tire radial direction of the pair of cross belts are disposed adjacent to each other, and
   an intercord distance Dc between belt cords of the large angle belt and belt cords of the cross belt is within a range of 0.50 mm≤Dc≤1.50 mm.

14. The pneumatic tire according to claim 1, wherein a modulus Es at 100% elongation of a coating rubber of the circumferential reinforcing layer is within a range of 4.5 MPa≤Es≤7.5 MPa.

15. The pneumatic tire according to claim 1, wherein moduli E2, E3 at 100% elongation of a coating rubber of the pair of cross belts and a modulus Es at 100% elongation of the coating rubber of the circumferential reinforcing layer have a relationship such that 0.90≤Es/E2≤1.10 and 0.90≤Es/E3≤1.10.

16. The pneumatic tire according to claim 1, wherein a breaking elongation λs of a coating rubber of the circumferential reinforcing layer is not less than 200%.

17. The pneumatic tire according to claim 1, further comprising a belt cushion disposed interposed between the carcass layer and an end portion of the cross belt on an inner side in the tire radial direction of the pair of cross belts, wherein
   a modulus Ebc at 100% elongation of the belt cushion is within a range of 1.5 MPa≤Ebc≤3.0 MPa.

18. The pneumatic tire according to claim 17, wherein a breaking elongation λbc of the belt cushion is not less than 400%.

19. The pneumatic tire according to claim 1, wherein, when left and right circumferential main grooves disposed furthest out in a tire width direction are referred to as outermost circumferential main grooves, when viewed as a cross-section from the tire meridian direction, the land portions located inward in the tire width direction from the left and right outermost circumferential main grooves have a first profile that protrudes outward in the tire radial direction, and also, the land portions located outward in the tire width direction from the left and right outermost circumferential main grooves, hereinafter, referred to as shoulder land portions, have a second profile that protrudes inward in the tire radial direction in a ground contact patch, and
   a distance d in the tire radial direction between an extended line of the first profile in the ground contact patch of the shoulder land portions and the second profile increases toward an outer side in the tire width direction.

20. The pneumatic tire according to claim 1, wherein belt cords of the circumferential reinforcing layer are steel wire and a number of ends in the circumferential reinforcing layer is not less than 17 ends/50 mm and not more than 30 ends/50 mm.

21. The pneumatic tire according to claim 1, wherein elongation of belt cords as components that constitute the circumferential reinforcing layer is not less than 1.0% and not more than 2.5% when a tensile load is from 100 N to 300 N.

22. The pneumatic tire according to claim 1, wherein elongation of belt cords as cured tire components that constitute the circumferential reinforcing layer is not less than 0.5% and not more than 2.0% when a tensile load is from 500 N to 1000 N.

23. The pneumatic tire according to claim 1, wherein the circumferential reinforcing layer is disposed inward in a tire width direction from left and right edge portions of a narrower cross belt of the pair of cross belts, and further comprising:
   a stress relief rubber disposed between the pair of cross belts and disposed outward of the circumferential reinforcing layer in the tire width direction so as to be adjacent to the circumferential reinforcing layer; and
   an end portion relief rubber disposed between the pair of cross belts and disposed outward of the stress relief rubber in the tire width direction and in a position corresponding to the edge portion of the pair of cross belts, the end portion relief rubber being adjacent to the stress relief rubber.

24. The pneumatic tire according to claim 23, wherein a modulus Ein at 100% elongation of the stress relief rubber and a modulus Eco at 100% elongation of a coating rubber of the pair of cross belts have a relationship such that Ein≤Eco.

25. The pneumatic tire according to claim 23, wherein a modulus Ein at 100% elongation of the stress relief rubber and a modulus Eco at 100% elongation of a coating rubber of the pair of cross belts have a relationship such that 0.6≤Ein/Eco≤0.9.

26. The pneumatic tire according to claim 23, wherein a modulus Ein at 100% elongation of the stress relief rubber is within a range of 4.0 MPa≤Ein≤5.5 MPa.

27. The pneumatic tire according to claim 1, wherein the circumferential reinforcing layer is disposed inward in a tire width direction from left and right edge portions of a narrower cross belt of the pair of cross belts, and a width Wb3 of the narrower cross belt and a distance S from an edge portion of the circumferential reinforcing layer to an edge portion of the narrower cross belt are in a range of 0.03≤S/Wb3.

28. The pneumatic tire according to claim 1 applied to a heavy duty tire with an aspect ratio of 70% or less.

29. The pneumatic tire according to claim 1, wherein the circumferential reinforcing layer terminates inward in the tire width direction of an outermost circumferential main groove in the tire width direction.

30. The pneumatic tire according to claim 1, wherein, when the land portion located furthest out in a tire width direction is referred to as a shoulder land portion, a diameter D1 of a tread profile along the tire equatorial plane, a diameter D2 of the tread profile at an edge portion of the shoulder land portion inward in the tire width direction, and a diameter D3 of the tread profile at an end portion of the circumferential reinforcing layer have a relationship such that D1>D2, D1>D3, and −0.65≤(D2−D3)/(D1−D3)≤0.

31. The pneumatic tire according to claim 1, wherein a tread width TW and a total tire width SW have a relationship such that 0.79≤TW/SW≤0.85.

32. The pneumatic tire according to claim 1, wherein a tread width TW and a width Ws of the circumferential reinforcing layer have a relationship such that 0.75≤Ws/TW≤0.90.

33. The pneumatic tire according to claim 1, wherein left and right circumferential main grooves disposed furthest out in a tire width direction are outermost circumferential main grooves, when viewed as a cross-section from the tire meridian direction, the land portions located inward in the tire width direction from the left and right outermost circumferential main grooves have a first profile that protrudes outward in the tire radial direction, and also, the land portions located outward in the tire width direction from the left and right outermost circumferential main grooves, hereinafter, referred to as shoulder land portions, have a second profile that protrudes inward in the tire radial direction in a ground contact patch, and a distance d in the tire radial direction between an extended line of the first profile in the ground contact patch of the shoulder land portions and the second profile increases toward an outer side in the tire width direction.

34. A pneumatic tire comprising:

a carcass layer;

a belt layer disposed outward of the carcass layer in a tire radial direction;

a tread rubber disposed outward of the belt layer in the tire radial direction; at least three circumferential main grooves extending in a tire circumferential direction; and a plurality of land portions partitioned by the circumferential main grooves, the belt layer being formed by laminating a pair of cross belts having belt angles, as an absolute value, of not less than 10° and not greater than 45° and of mutually opposite signs, and a circumferential reinforcing layer having a belt angle within a range of ±5° with respect to the tire circumferential direction, when viewed as a cross-section from a tire meridian direction, when a wear end surface WE of the circumferential main grooves is drawn, a distance Dcc from the circumferential reinforcing layer to the wear end surface WE along a tire equatorial plane and a distance De from an end portion of the circumferential reinforcing layer to the wear end surface WE having a relationship such that De/Dcc≤0.94, a diameter Ya at a highest position of the carcass layer and a diameter Yd of the carcass layer at a position of the end portion of the circumferential reinforcing layer having a relationship such that 0.95≤Yd/Ya≤1.02, a tread width TW and a width Ws of the circumferential reinforcing layer having a relationship such that 0.75≤Ws/TW≤0.90, the land portion located furthest out in a tire width direction being referred to as a shoulder land portion, a diameter D1 of a tread profile along the tire equatorial plane, a diameter D2 of the tread profile at an edge portion of the shoulder land portion inward in the tire width direction, and a diameter D3 of the tread profile at an end portion of the circumferential reinforcing layer having a relationship such that D1>D2, D1>D3, and 0≤(D2−D3)/(D1−D3)≤0.85, and the circumferential reinforcing layer terminating inward in the tire width direction of an outermost circumferential main groove in the tire width direction.

\* \* \* \* \*